United States Patent
Schuler et al.

(10) Patent No.: US 10,803,540 B2
(45) Date of Patent: *Oct. 13, 2020

(54) SYSTEM FOR VALIDATING AND APPENDING INCIDENT-RELATED DATA RECORDS IN A DISTRIBUTED ELECTRONIC LEDGER

(71) Applicant: MOTOROLA SOLUTIONS, INC, Chicago, IL (US)

(72) Inventors: Francesca Schuler, Palatine, IL (US); Thomas S Messerges, Schaumburg, IL (US); Bradley M. Hiben, Glen Ellyn, IL (US); Daniel A Law, Glencoe, IL (US); Eric Johnson, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 318 days.

This patent is subject to a terminal disclaimer.

(21) Appl. No.: 15/920,772

(22) Filed: Mar. 14, 2018

(65) Prior Publication Data

US 2019/0287200 A1   Sep. 19, 2019

(51) Int. Cl.
*G06Q 10/10* (2012.01)
*G06Q 30/02* (2012.01)
(Continued)

(52) U.S. Cl.
CPC ........... *G06Q 50/265* (2013.01); *G06F 16/27* (2019.01); *H04L 9/3239* (2013.01); *H04L 2209/38* (2013.01)

(58) Field of Classification Search
CPC ..... G06Q 50/265; G06F 16/27; H04L 9/3239; H04L 2209/38
(Continued)

(56) References Cited

U.S. PATENT DOCUMENTS 9,298,806 B1   3/2016 Vessenes et al.
2015/0332283 A1   11/2015 Witchey
(Continued)

OTHER PUBLICATIONS

Anonymous: "hyperledger-fabricdocs Documentation", Mar. 6, 2018, XP055577057,Retrieved from the Internet: URL:https://buildmedia.readthedocs.org/med ia/pdf/nick-fabric/latest/nick-fabric.pdf [retrieved on Apr. 3, 2019] p. 1-p. 32.

(Continued)

*Primary Examiner* — Jonathan P Ouellette
(74) *Attorney, Agent, or Firm* — Daniel R. Bestor

(57) ABSTRACT

A computer apparatus, such as a validator node, for validating incident-related data records in a distributed electronic ledger is configured to receive a request from an agent to add a proposed incident-related data record associated with an incident to the distributed electronic ledger. In response to the proposed incident-related data record, the computer apparatus determines, from the distributed electronic ledger, one or more attributes of the agent or incident. The computer apparatus determines whether the proposed incident-related data record satisfies validation criteria based at least partially on the one or more attributes of the agent or incident. Once validated, the computer apparatus may then append the proposed incident-related data record to the distributed electronic ledger. Alternatively, the proposed incident-related data record may be appended regardless of validity, but an indication of validity may be appended if the proposed incident-related data record is validated.

23 Claims, 8 Drawing Sheets

(51) Int. Cl.
*G06Q 40/08* (2012.01)
*G06Q 10/08* (2012.01)
*G06Q 50/26* (2012.01)
*G06F 16/27* (2019.01)
*H04L 9/32* (2006.01)

(58) Field of Classification Search
USPC .................................................. 705/1.1–912
See application file for complete search history.

(56) References Cited

U.S. PATENT DOCUMENTS

| | | |
|---|---|---|
| 2017/0075941 A1 | 3/2017 | Finlow-Bates |
| 2018/0018723 A1 | 1/2018 | Nagla et al. |
| 2018/0060496 A1* | 3/2018 | Bulleit .................. H04L 9/3239 |
| 2019/0109713 A1* | 4/2019 | Clark ..................... G06Q 20/36 |
| 2019/0188706 A1* | 6/2019 | McCurtis ............... G06Q 20/40 |
| 2019/0207751 A1* | 7/2019 | Harvey ................. H04L 9/0643 |
| 2019/0279227 A1* | 9/2019 | Chantz .................... H04W 4/44 |

OTHER PUBLICATIONS

The International Search Report and the Written Opinion corresponding patent application No. PCT/US2019/018504 filed Feb. 19, 2019, dated Apr. 12, 2019, all pages.

* cited by examiner

SYSTEM FOR VALIDATING AND APPENDING INCIDENT-RELATED DATA RECORDS IN A DISTRIBUTED ELECTRONIC LEDGER

BACKGROUND OF THE INVENTION

As the data storage needs of agencies increases over time, the agencies may utilize centralized databases to store and manage data. That said, conventional database systems may pose numerous technical challenges from a data management perspective. For example, the data stored on individual databases may be vulnerable to data corruption, loss, and/or modification. If the database on which the data is stored suffers a failure or an attack, it may be difficult to recover the original, unmodified data. In some instances, it may be difficult for the agency to determine whether said data has been modified. Furthermore, centralized databases may serve as a single point of failure, such that corruption or unavailability of the centralized database may prevent the other computing devices within the agency's system from fully accessing data therein. Accordingly, there is a need for a more secure and resilient system for validating, storing, and managing incident-related data.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
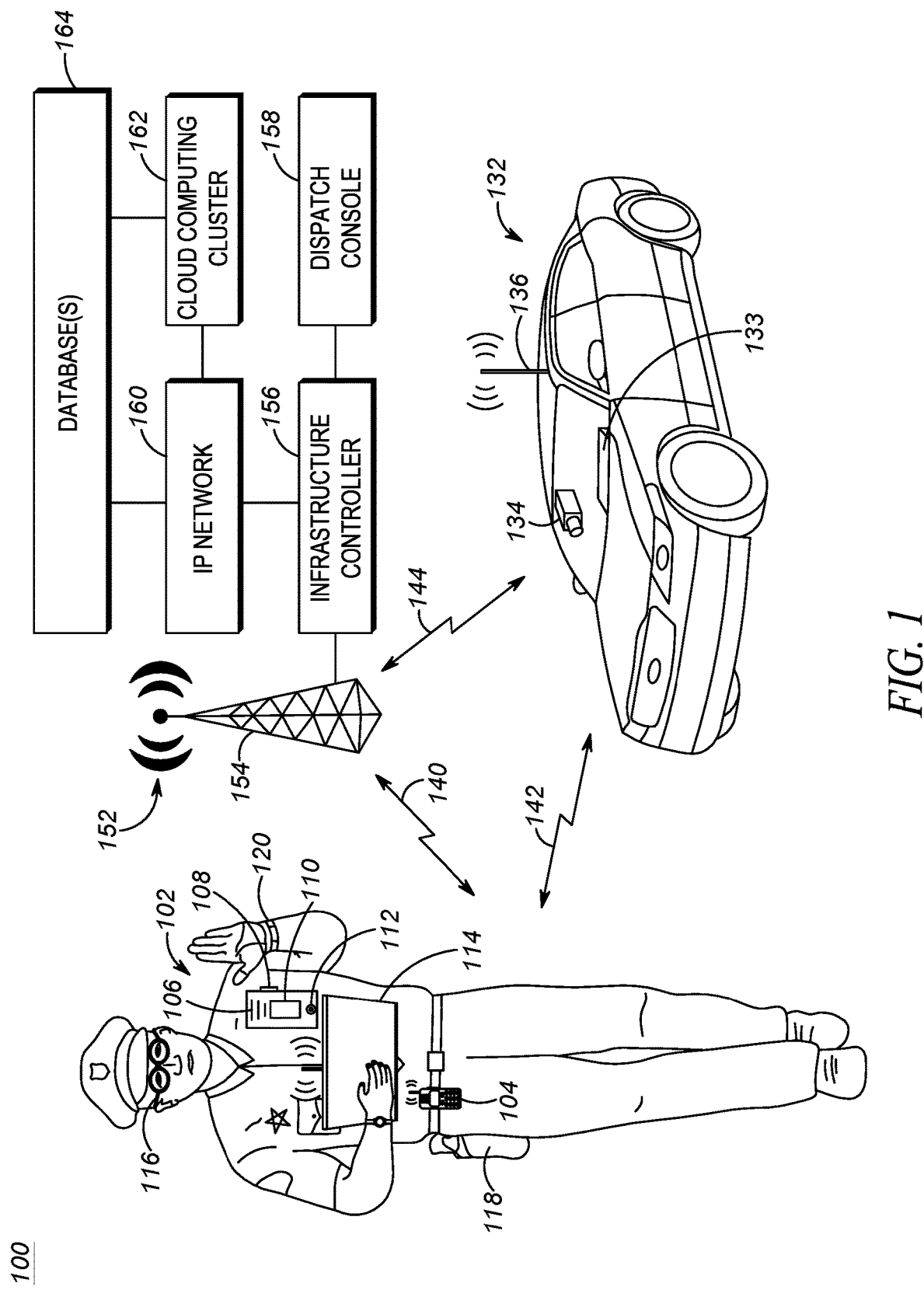
FIG. 1 is a system diagram illustrating a system for collecting incident-related data for validation and storage into a distributed ledger, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Enterprise and Government agencies that utilize traditional centralized databases to manage their agency, personnel, incident, or other types of data records may face a number of technical challenges. For instance, storing an agency's data on a centralized database may open the data to issues of a single point of failure, such that agency devices may not be able to access the agency's data in the event of data loss, corruption, improper modification, server unavailability, and the like. Furthermore, in the event that the existing data in a centralized database is modified due to a software bug, computer virus, malicious activity, or the like, it may become difficult to detect or prove that such a modification has occurred. This may be particularly important with respect to public safety or utilities agencies that may desire to maintain a tamper-resistant and authentic chain of evidence and maintain accurate records of agency resources. Accordingly, there is a need for an improved technically resilient and secure way to validate, store, and manage agency, personnel, incident, or other types of data records.

A first embodiment is directed to a computer apparatus for validating and appending incident-related data records on a distributed electronic ledger. The apparatus may comprise a communication interface; one or more processors; and a memory having executable code stored therein. The executable code, when executed by the one or more processors, causes the one or more processors to receive a request from an agent associated with an agency to add a proposed incident-related data record associated with an incident to which the agency is tasked with responding to a distributed electronic ledger associated with the incident; determine, from the distributed electronic ledger or an agency-specific database, one or more attributes of the agent relative to the incident and/or of the incident; determine that the proposed incident-related data record satisfies validation criteria based at least partially on the determined one or more attributes; and responsive to determining that the proposed incident-related data record satisfies the validation criteria, one of (i) appending the proposed incident-related data record to one of the distributed electronic ledger associated with the incident and a second distributed electronic ledger associated with the incident and (ii) appending an indication of validity to one of the distributed electronic ledger associated with the incident and the second distributed electronic ledger associated with the incident referencing the proposed incident-related data record already appended to the one of the distributed electronic ledger associated with the incident and the second distributed electronic ledger associated with the incident.

In a first aspect of the first embodiment, the executable code, when executed by the one or more processors, causes the one or more processors to, based at least partially on determining that the proposed incident-related data record satisfies the validation criteria, submit a first validation vote.

The executable code, when executed by the one or more processors, may cause the one or more processors to receive one or more second validation votes submitted by one or more validator nodes; and based at least partially on the first validation vote and the one or more second validation votes, determine, via a consensus algorithm, that the proposed incident-related data record satisfies the validation criteria.

In a second aspect of the first embodiment, either alone or in combination with the any other aspect of the first embodiment, the proposed incident-related data record may be appended to the distributed electronic ledger responsive to determining that the proposed incident-related data record satisfies the validation criteria.

In a third aspect of the first embodiment, either alone or in combination with the any other aspect of the first embodiment, the proposed incident-related data record may be appended to the distributed electronic ledger regardless of whether the proposed incident-related data record satisfies the validation criteria. The executable code, when executed by the one or more processors, may cause the one or more processors to, responsive to determining that the proposed incident-related data record satisfies the validation criteria, append the indication of validity of the proposed incident-related data record to the distributed electronic ledger.

In a fourth aspect of the first embodiment, either alone or in combination with the any other aspect of the first embodiment, the executable code, when executed by the one or more processors, may cause the one or more processors to, in response to determining that the proposed incident-related data record satisfies the validation criteria, append the proposed incident-related data record, or the indication of validity of the proposed incident-related data record, to the second distributed electronic ledger, the second distributed electronic ledger being different from the distributed electronic ledger.

In a fifth aspect of the first embodiment, either alone or in combination with any other aspect of the first embodiment, the executable code, when executed by the one or more processors, causes the one or more processors to determine that the incident has been completed; and in response to determining that the incident has been completed, close the distributed electronic ledger and prevent the addition of any further data records relative to the incident.

In a sixth aspect of the first embodiment, either alone or in combination with any other aspect of the first embodiment, the distributed electronic ledger is associated with the incident. The executable code, when executed by the one or more processors, causes the one or more processors to determine, from the distributed electronic ledger, the one or more attributes of the agent relative to the incident, wherein determining that the proposed incident-related data record satisfies the validation criteria is based at least partially on the one or more attributes of the agent relative to the incident. The executable code, when executed by the one or more processors, may cause the one or more processors to determine, from the distributed electronic ledger, the one or more attributes of the incident, wherein determining that the proposed incident-related data record satisfies the validation criteria is based at least partially on the one or more attributes of the incident.

In a seventh aspect of the first embodiment, either alone or in combination with any other aspect of the first embodiment, the distributed electronic ledger is associated with the incident. The executable code, when executed by the one or more processors, causes the one or more processors to determine, from the distributed electronic ledger, the one or more attributes of the incident, wherein determining that the proposed incident-related data record satisfies the validation criteria is based at least partially on the one or more attributes of the incident.

In an eighth aspect of the first embodiment, either alone or in combination with any other aspect of the first embodiment, the one or more attributes of the agent and/or incident comprise an incident type, an incident status, an incident location, a role of the agent at the incident, a location of the agent relative to the incident, and/or one or more attributes of a resource relative to the incident.

In a ninth aspect of the first embodiment, either alone or in combination with any other aspect of the first embodiment, the executable code, when executed by the one or more processors, causes the one or more processors to receive a request to add a proposed attribute data record to the distributed electronic ledger, the proposed attribute data record provisioning an incident type, an attribute of the agent relative to the incident, or an attribute of a resource relative to the incident; validate the proposed attribute data record; and append the proposed attribute data record to the distributed electronic ledger; wherein determining that the proposed incident-related data record satisfies the validation criteria is based at least partially on the proposed attribute data record appended to the distributed electronic ledger.

In a tenth aspect of the first embodiment, either alone or in combination with any other aspect of the first embodiment, the executable code, when executed by the one or more processors, causes the one or more processors to receive a request to add a second proposed incident-related data record associated with the incident to the distributed electronic ledger; determine that the second proposed incident-related data record satisfies the validation criteria based at least partially on the proposed incident-related data record appended to the distributed electronic ledger; and responsive to determining that the second proposed incident-related data record satisfies the validation criteria, one of (i) appending the second proposed incident-related data record to one of the distributed electronic ledger associated with the incident and the second distributed electronic ledger associated with the incident and (ii) appending an indication of validity to one of the distributed electronic ledger associated with the incident and the second distributed electronic ledger associated with the incident referencing the second proposed incident-related data record already appended to the one of the distributed electronic ledger associated with the incident and the second distributed electronic ledger associated with the incident.

In an eleventh aspect of the first embodiment, either alone or in combination with any other aspect of the first embodiment, the distributed electronic ledger is a blockchain.

In a twelfth aspect of the first embodiment, either alone or in combination with any other aspect of the first embodiment, the distributed electronic ledger is a permissioned blockchain accessible only to agents assigned to the incident.

In a thirteenth aspect of the first embodiment, either alone or in combination with any other aspect of the first embodiment, receiving the request from the agent associated with the agency to add the proposed incident-related data record comprising receiving the request from a police officer or dispatcher associated with a police agency to add the proposed incident-related data record associated with the incident, wherein the incident is a public safety incident, wherein the proposed incident-related data record comprises electronic evidence associated with the public safety incident, metadata of physical evidence associated with the public safety incident, a request to assign the police officer to the public safety incident, a request to update the status of the public safety incident, a location of the public safety incident, or a jurisdiction of the public safety incident; determining, from the distributed electronic ledger, one or more attributes of the agent relative to the incident and/or of the incident comprises determining, from the distributed electronic ledger, one or more attributes of the police officer and/or dispatcher, wherein the one or more attributes of the police officer and/or dispatcher comprises a status of the police officer and/or dispatcher, a skill set of the police officer and/or dispatcher, a location of the police officer and/or dispatcher, or a role of the police officer and/or dispatcher; and determining that the proposed incident-related data record satisfies validation criteria based at least partially on the determined one or more attributes comprises determining that the police officer is currently assigned to the public safety incident, that the location of the police officer is within a threshold distance from the location of the public safety incident, that the role of the police officer is appropriate for the public safety incident, that the role of the dispatcher is appropriate for assigning the police officer to the public safety incident, or that the police officer has not been assigned to another incident.

A second embodiment is directed to a computer program product for validating and appending incident-related data records on a distributed electronic ledger, the computer program product comprising at least one non-transitory computer readable medium having computer-readable program code portions embodied therein, the computer-readable program code portions comprising an executable portion for receiving, via a computer apparatus, a request from an agent associated with an agency to add a proposed incident-related data record associated with an incident to which the agency is tasked with responding to a distributed electronic ledger associated with the incident; an executable portion for determining, via the computer apparatus, from the distributed electronic ledger or an agency-specific database, one or more attributes of the agent relative to the incident and/or of the incident; an executable portion for determining, via the computer apparatus, that the proposed incident-related data record satisfies validation criteria based at least partially on the determined one or more attributes; and an executable portion for, responsive to determining that the proposed incident-related data record satisfies the validation criteria, one of (i) appending, via the computer apparatus, the proposed incident-related data record to one of the distributed electronic ledger associated with the incident and a second distributed electronic ledger associated with the incident and (ii) appending, via the computer apparatus, an indication of validity to one of the distributed electronic ledger associated with the incident and the second distributed electronic ledger associated with the incident referencing the proposed incident-related data record already appended to the one of the distributed electronic ledger associated with the incident and the second distributed electronic ledger associated with the incident.

A third embodiment is directed to a computer-implemented method for validating and appending incident-related data records on a distributed electronic ledger, the method comprising receiving, via a computer apparatus, a request from an agent associated with an agency to add a proposed incident-related data record associated with an incident to which the agency is tasked with responding to a distributed electronic ledger associated with the incident; determining, via the computer apparatus, from the distributed electronic ledger or an agency-specific database, one or more attributes of the agent relative to the incident and/or of the incident; determining, via the computer apparatus, that the proposed incident-related data record satisfies validation criteria based at least partially on the determined one or more attributes; and, responsive to determining that the proposed incident-related data record satisfies the validation criteria, one of (i) appending, via the computer apparatus, the proposed incident-related data record to one of the distributed electronic ledger associated with the incident and a second distributed electronic ledger associated with the incident and (ii) appending, via the computer apparatus, an indication of validity to one of the distributed electronic ledger associated with the incident and the second distributed electronic ledger associated with the incident referencing the proposed incident-related data record already appended to the one of the distributed electronic ledger associated with the incident and the second distributed electronic ledger associated with the incident.

In a first aspect of the third embodiment, either alone or in combination with any other aspect of the third embodiment, the method further comprises, responsive to determining that the proposed incident-related data record satisfies the validation criteria, submitting, via the computer apparatus, a first validation vote. The method may further comprise receiving, via the computer apparatus, one or more second validation votes submitted by one or more validator nodes; and based at least partially on the first validation vote and the one or more second validation votes, determining, via the computer apparatus, via a consensus algorithm, that the proposed incident-related data record satisfies the validation criteria.

In a second aspect of the third embodiment, either alone or in combination with any other aspect of the third embodiment, the proposed incident-related data record may be appended to the distributed electronic ledger responsive to determining that the proposed incident-related data record satisfies the validation criteria.

In a third aspect of the third embodiment, either alone or in combination with any other aspect of the third embodiment, the proposed incident-related data record may be appended to the distributed electronic ledger regardless of whether the proposed incident-related data record satisfies the validation criteria.

In a fourth aspect of the third embodiment, either alone or in combination with any other aspect of the third embodiment, the method may further comprise, responsive to determining that the proposed incident-related data record satisfies the validation criteria, appending an indication of validity of the proposed incident-related data record to the distributed electronic ledger.

Each of the above-mentioned embodiments will be discussed in more detail below. Section 1 describes an exemplary communication system and device architectures. Section 2 describes a general distributed ledger system, processes, and data structures that may be found therein. Section 3 describes the distributed ledger system's operating environment, layout, and processes in further detail relative to incident-related (and other) data records. Further advantages and features consistent with this disclosure will be set forth in the following detailed description, with reference to the figures.

1. Communication Devices and Device Structures a. Communication Devices

The invention as described herein may be configured to receive data from a number of different communication devices for storage into the distributed ledger system. In particular, an agency's responders may utilize a number of different communication devices to collect incident data and/or upload such incident data (e.g., video/audio/image files, text or document files, etc.) to the distributed ledger system. Furthermore, some of the communication devices as described herein may serve as nodes of the distributed ledger, terminal client devices within the agency's systems, database systems, and the like. A more detailed description of examples of such communication devices follows. The below example is within the context of a first responder system, such as a police department, EMT or fire department. The following is given as an example and it is understood that the communication devices may be any form of device used in any context where communication devices are used to provide information about an incident.

Figure 2:
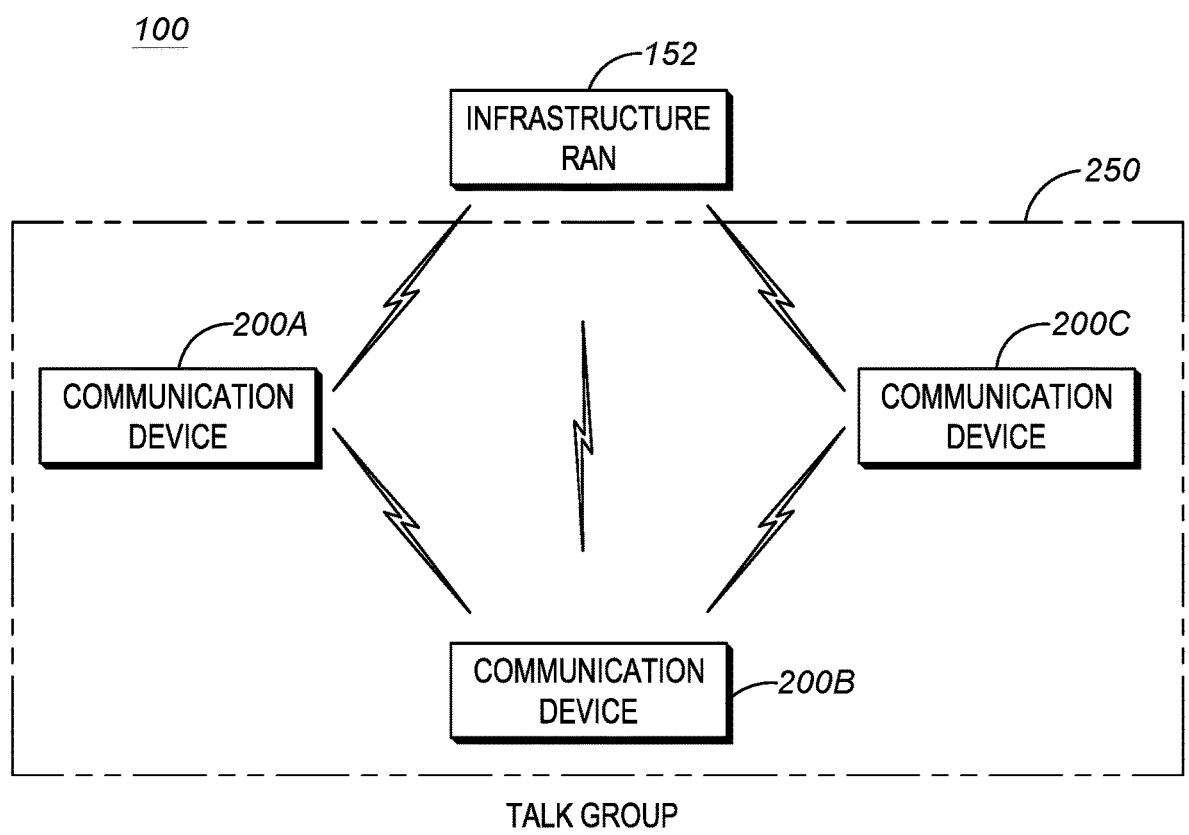
FIG. 2 is a system diagram illustrating a plurality of devices of FIG. 1, in accordance with some embodiments.

Referring now to the drawings, and in particular FIGS. 1 and 2, a set of communication devices 200 within the communication system 100 is shown including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices as indicated by FIG. 2.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices are configured to receive inputs associated with the user 102 and/or provide outputs to the user 102 in addition to communicating information to and from other communication devices and the infrastructure RAN 152.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, communication devices 200A, 200B, 200C shown in FIG. 2). Although FIG. 1 shows multiple communication devices 200 associated with the user 102, in some embodiments, the communication system 100 includes communication devices 200 of multiple users. For example, as shown in FIG. 2, the communication device 200A is associated with a first user, the communication device 200B is associated with a second user, and the communication device 200C is associated with a third user. Further, as shown in FIG. 2, the communication devices 200A, 200B, and 200C are members of the same talk group i.e., talk group 250. Although not shown in FIG. 2, each of the communication devices 200A, 200B, 200C may also be associated with one or more talk groups other than the talk group 250. The communication devices 200A, 200B, 200C will be interchangeably referred to hereafter, collectively, as communication devices 200 or device 200, and generically as a communication device 200 or device 200. In some embodiments, the communication devices 200 communicate with each other over the infrastructure RAN 152 and/or communicate with each other directly as described herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1.

Referring back to FIG. 1, the portable radio 104, in particular, may be any communication device 200 used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a universal serial bus (USB) port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or near field communication (NFC) transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch/interface or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and that switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture (such as a talk group 250 shown in FIG. 2) that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well.

A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (that may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1 may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of communication devices. Such communication devices may be portable, mobile, or stationary and may include any one or more of the communication devices illustrated in FIG. 1, among other possibilities. At least one other terminal, for example used in conjunction with the communication devices, may be a fixed terminal, for example a base station, eNodeB, repeater, and/or access point. Such a RAN may include a system infrastructure that generally includes a network of various fixed terminals, which are in direct radio communication with the communication devices. Each of the fixed terminals operating in the RAN 152 may have one or more transceivers that may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a wireless local area network (WLAN) technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency division multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server (also referred to as a talk group server) that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together that form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including the dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, a back-end node in a distributed ledger, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service or back-end distributed ledger node, sequentially or in parallel, across the one or more computing devices. The one or more computing devices comprising the cloud computing cluster 162 may be geographically co-located or may be separated by inches, meters, or miles, and inter-connected via electronic and/or optical interconnects.

As shown in FIG. 1, database(s) 164 may be accessible via the IP network 160 and/or the cloud computing cluster 162. As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with, retrieve data from, and store data in the databases 164 via infrastructure controller 156 and IP network 160. In some embodiments, the databases 164 may comprise the distributed electronic ledger. In this regard, copies of the distributed electronic ledger may be stored on multiple devices and systems. In some embodiments, the databases 164 are commercial cloud-based storage devices. In some embodiments, the databases 164 are housed on suitable on-premises database servers.

The database(s) may include databases such as a long-term video storage database, a historical or forecasted weather database, an offender database perhaps including facial recognition images to match against, a cartographic database of streets and elevations, a traffic database of historical or current traffic conditions, incident database including data such as incident assignment and timeline of incidents, or other types of databases. The databases may include metadata and other information about physical evidence located in physical storage. In a particular embodiment, the databases 164 may include a distributed electronic ledger that is used to store records related to incidents, agents, and/or other transactions. Said distributed ledger may be linked to other databases (e.g., long-term video and image storage database) that may contain files related to incident/transaction records. Databases 164 may further include all or a portion of the databases described herein as being provided at the infrastructure controller 156. In some embodiments, the databases 164 (or a subset of such databases) may be maintained by third parties (for example, the National Weather Service or a Department of Transportation, respectively). The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a system 100 generally as a public safety system that includes a user 102 generally described as a police officer and a vehicle 132 generally described as a police cruiser, in other embodiments, the communication system 100 may additionally or alternatively be a retail system including a user 102 that may be an employee of a retailer and a vehicle 132 that may be a vehicle for use by the user 102 in furtherance of the employee's retail duties (for example, a shuttle or self-balancing scooter). In other embodiments, the system 100 may additionally or alternatively be a warehouse system including a user 102 that may be an employee of a warehouse and a vehicle 132 that may be a vehicle for use by the user 102 in furtherance of the employee's retail duties (for example, a forklift). In still further embodiments, the system 100 may additionally or alternatively be a private security system including a user 102 that may be an employee of a private security company and a vehicle 132 that may be a vehicle for use by the user 102 in furtherance of the private security employee's duties (for example, a private security vehicle or motorcycle).

In even further embodiments, the system 100 may additionally or alternatively be a medical system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the system 100 may additionally or alternatively be a heavy machinery system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). In yet another example embodiment, the system 100 may be a utilities service system including a user 102 that may be a responder such as a utilities worker. Said system may further comprise devices such as a user's 102 laptop, smart device, portable video/audio capture device, a vehicle 132 for use by the user 102 in furtherance of utilities maintenance and/or incident management activities. Other possibilities exist as well.

b. Device Structure

Figure 3:
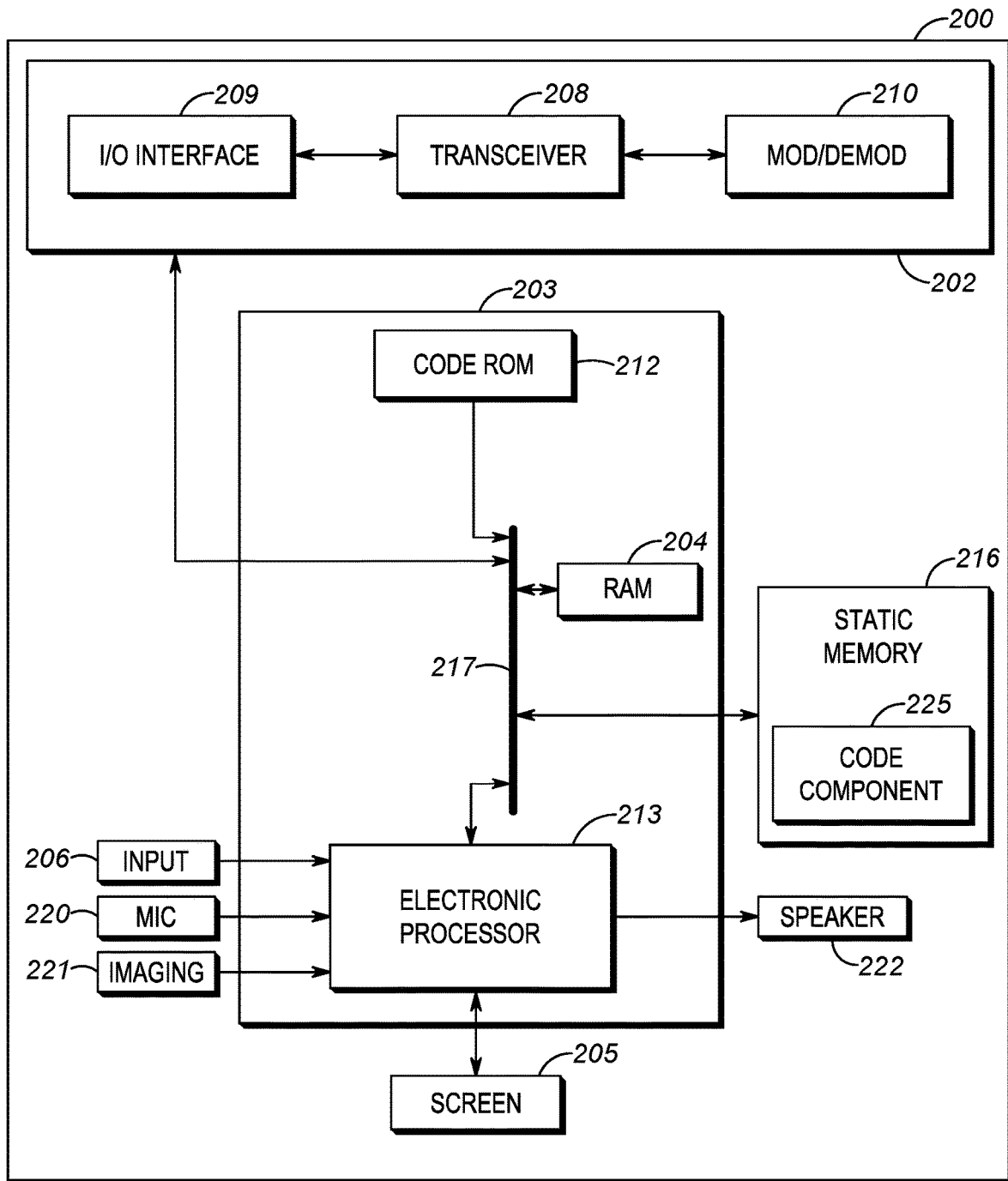
FIG. 3 is a device diagram showing a device structure of a device of the system of FIGS. 1 and 2 in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 represents the communication devices 200 described above with respect to FIGS. 1 and 2, depending on the type of the communication device, the communication device 200 may include fewer or additional components in configurations different from that illustrated in FIG. 3. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 of the RSM video capture device 106 may further include a location determination device (for example, a global positioning system (GPS) receiver) as explained above. Other combinations are possible as well.

As shown in FIG. 3, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (that, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 9 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Distributed Ledger System and Data Structures

Embodiments of the present disclosure may utilize a blockchain or other distributed ledger system to store, recall, and/or validate agency, incident, personnel, or other types of data. "Distributed ledger" or "distributed electronic ledger" as used herein may refer to a structured list of data records that is decentralized and distributed amongst a plurality of computing systems and devices. In some embodiments, the distributed ledger may be a blockchain ledger or a hash calendar, among other possibilities. As noted above, the computing systems on which the distributed ledger is hosted may herein be referred to as "nodes." In particular, the nodes that perform validation of data records via a consensus algorithm may be referred to as "validator nodes." In some embodiments, each node maintains a full copy of the distributed ledger, although it is within the scope of the present disclosure for any particular node or all nodes to contain a partial copy of the distributed ledger.

"Agency" as used herein may refer to an organizational entity that may store and/or retrieve various types of data records (e.g., in the distributed ledger) related to the organization's goals, activities, resources, and the like. In some embodiments, the agency may be a private enterprise organization such as a utilities, oil/gas, electric, private security, or water company or other business. In other embodiments, the agency may be a public organization such as a public-safety agency (e.g., police, fire, etc.), government entity, and the like. "Incident" as used herein may refer to an event, occurrence, or situation that the agency has been tasked to resolve (e.g., a traffic accident, public disturbance, medical emergency, fire, broken water meter or power line, etc.).

"Incident-related data record" as used herein may refer to a data record that is associated with a particular incident or that defines valid incident types. Accordingly, incident-related data records may contain electronic evidence (e.g., video files, audio files, images, etc.), data or metadata regarding physical evidence (e.g., crime scene evidence such as a victim's shoe). Incident-related data records may further define roles, assign resources, update the status of an incident, or the like. Incident-related data records may also be used to assign attributes to the incident to indicate the nature of the incident (e.g., a chemical spill may require the attention of a chemical specialist).

If the distributed ledger is in the form of a blockchain, the blockchain may comprise a series of "blocks" that may in turn comprise data and metadata. The "data" within each block may comprise one or more "data records" or "transactions." The "metadata" within each block may comprise information about the block, such as a timestamp, a hash of data records within the block, a pointer to the previous block, and the like. In particular, the blockchain begins with a genesis block and is subsequently lengthened by appending blocks in series to the genesis block. Generally, the data within each block within the blockchain may not be modified by the nodes of the blockchain after it is added; and data may only be added through the addition of a new block after the last block in the existing blockchain. Each new block added to the blockchain may comprise a timestamp and a pointer to the previous block in the blockchain. In this way, the blockchain may provide an immutable record of data records over a period of time. In some embodiments, in order for a new block to be added to the blockchain, a pending data record or transaction may be proposed to be added to the blockchain. The nodes may then, via a "consensus algorithm" or "consensus mechanism," come to a consensus as to the contents of the data to be added in the blockchain. Once a consensus has been reached by the nodes that the pending data record is valid, the nodes append the data record to the last block in the blockchain.

In other embodiments, other forms of distributed ledgers may be used. For example, the distributed ledger may take the form of a Directed Acyclic Graph (DAG), which may be a finite graph comprising one or more directional edges and/or vertices. In such embodiments, data records may be stored in the vertices of the DAG, while the relationships may be defined using directed edges. Alternatively, the distributed ledger may take the form of a distributed hash calendar such as the Keyless Signature Infrastructure (KSI), in which each node comprises a database for which hash values are generated in fixed intervals over time.

In other embodiments, a Hashgraph may be used, which uses a "gossip" protocol to propagate information relating to new data records. Each node may propagate information to one or more receiving nodes (which may be performed at random), where the receiving nodes may aggregate the information received from other nodes and further propagate the information to other receiving nodes, until each node within the Hashgraph system becomes aware of all relevant information relating to the new data records. Other possibilities exist as well.

In a distributed ledger system, each node may maintain a validated copy of the distributed ledger such that the distributed ledger may remain accessible even if one or more nodes become unavailable (e.g., a node is offline due to maintenance, malfunction, etc.) and may further account for divergence from the true copy of the distributed ledger which may occur at the node level (e.g., a copy of the distributed ledger on a particular node becomes invalid due to data corruption, malicious editing, and the like). In other words, the consensus mechanism may ensure that, over time, each node hosts a copy of the distributed ledger that is consistent with the other nodes. In some embodiments, the distributed ledger may be either unpermissioned or permissioned, and/or either public or private. A "public" distributed ledger may refer to a distributed ledger that is accessible to any member of the public, whereas a "private" distributed ledger may refer to a distributed ledger that is accessible only to users, agents, or computing devices who meet a certain criteria (e.g., limited to employees of a particular agency or group of agencies). A "permissioned" distributed ledger may refer to a distributed ledger for which an access control mechanism is implemented such that only known, authorized users may take certain actions within the distributed ledger (e.g., add new data records, contribute to consensus), whereas an "unpermissioned" distributed ledger may refer to a distributed ledger without an access control mechanism. Accordingly, the distributed ledger may be an unpermissioned and public ledger, an unpermissioned and private ledger, a permissioned and public ledger, or a permissioned and private ledger.

If the distributed ledger is permissioned, the system may use various methods to control access to the distributed ledger. For example, the system may require users to obtain a stake in a digital currency or point system in order to validate transactions (e.g., a "proof of stake" mechanism). In other embodiments, digital certificates may be provided to authorized nodes within the system, such as by using a Membership Service Provider (MSP) with Hyperledger Fabric. By using the digital certificates, the nodes may authenticate one another to ensure that the nodes are authorized to submit proposed data records and/or participate in the consensus mechanism. In other embodiments, access control may be implemented using smart contracts or chaincode that contain validation check mechanisms (e.g., on an Ethereum network).

"Smart contract" or "chaincode" as used herein may refer to computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored. A consensus algorithm, which may incorporate the smart contract or chaincode or may be executed in a separate process in addition to or instead of the smart contract or chaincode, may be executed by the nodes of the distributed ledger to determine whether a proposed data record should be added to the distributed ledger. In the latter case, the consensus algorithm may be used to confirm that a majority of the validation nodes agree on the results of the smart contract or chaincode. In some embodiments, the consensus algorithm may further be used to determine an order in which proposed data records are added to the distributed ledger.

Embodiments of the disclosure as described herein may utilize one, several, or a combination (i.e., hybrid) of a number of different consensus algorithms to ensure the integrity of the data records within the blockchain. A non-exhaustive description of exemplary consensus algorithms follows. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g., SHA256) that satisfies certain conditions set by the system. Calculating a hash in this way may be referred to herein as "mining," and thus nodes performing the mining may be referred to as "miners" or "miner nodes." The system may, for example, require the value of the hash to be under a specific threshold. In such embodiments, the nodes may combine a "base string" (i.e., a combination of various types of metadata within a block header, e.g., root hashes, hashes of previous blocks, timestamps, etc.) with a "nonce" (e.g., a whole number value) to be input into the PoW algorithm to produce a hash. In an exemplary embodiment, the nonce may initially be set to 0 when calculating a hash value using the PoW algorithm. The nonce may then be incremented by a value of 1 and used to calculate a new hash value as necessary until a node is able to determine a nonce value that results in a hash value under a specified threshold (e.g., a requirement that the resulting hash begins with a specified number of zeros). The first node to identify a valid nonce may broadcast the solution (in this example, the nonce value) to the other nodes of the blockchain for validation. Once the other nodes have validated the "winning" node's solution, the pending data record may be appended to the last block in the blockchain. In some cases, a divergence in blockchain copies may occur if multiple nodes calculate a valid solution in a short timeframe. In such cases, the nodes using the PoW algorithm accept the longest chain of blocks (i.e., the chain with the greatest proof of work) as the "true" version of the blockchain. Subsequently, all nodes having a divergent version of the blockchain may reconcile their copies of the blockchain to match the true version as determined by the consensus mechanism.

In other embodiments, the consensus mechanism may be a "proof of stake" ("PoS") algorithm, in which the validation of pending data records depends on a user's "stake" within the blockchain. For example, the user's "stake" may depend on the user's stake in a digital currency or point system (e.g., a cryptocurrency, reputation point system, etc.) within the blockchain. The next block in the blockchain may then be decided by the pending data record that collects the greatest number of votes. A greater stake (e.g., in a given digital currency or point system) results in a greater number of votes that the user may allocate to particular pending data records, which in turn increases the chance for a particular user to create blocks in the blockchain system.

In yet other embodiments, the consensus mechanism may be a "practical byzantine fault tolerance" ("PBFT") algorithm, in which each node validates pending data records by using a stored internal state within the node. In particular, a user or node may submit a request to post a pending data record to the blockchain. Each of the nodes in the blockchain may then run the PBFT algorithm using the pending data record and each node's internal state to come to a conclusion about the pending data record's validity. Upon reaching said conclusion, each node may submit a vote (e.g., "yes" or "no") to the other nodes in the blockchain. A consensus is reached amongst the nodes by taking into account the total number of votes submitted by the nodes. Subsequently, once a threshold number of nodes have voted "yes," the pending data record is treated as "valid" and is thereafter appended to the blockchain across all of the nodes. It should be understood that although the consensus mechanisms have been described herein in the context of blockchains, the consensus mechanisms may also be applicable to other forms of distributed ledgers.

Figure 4:
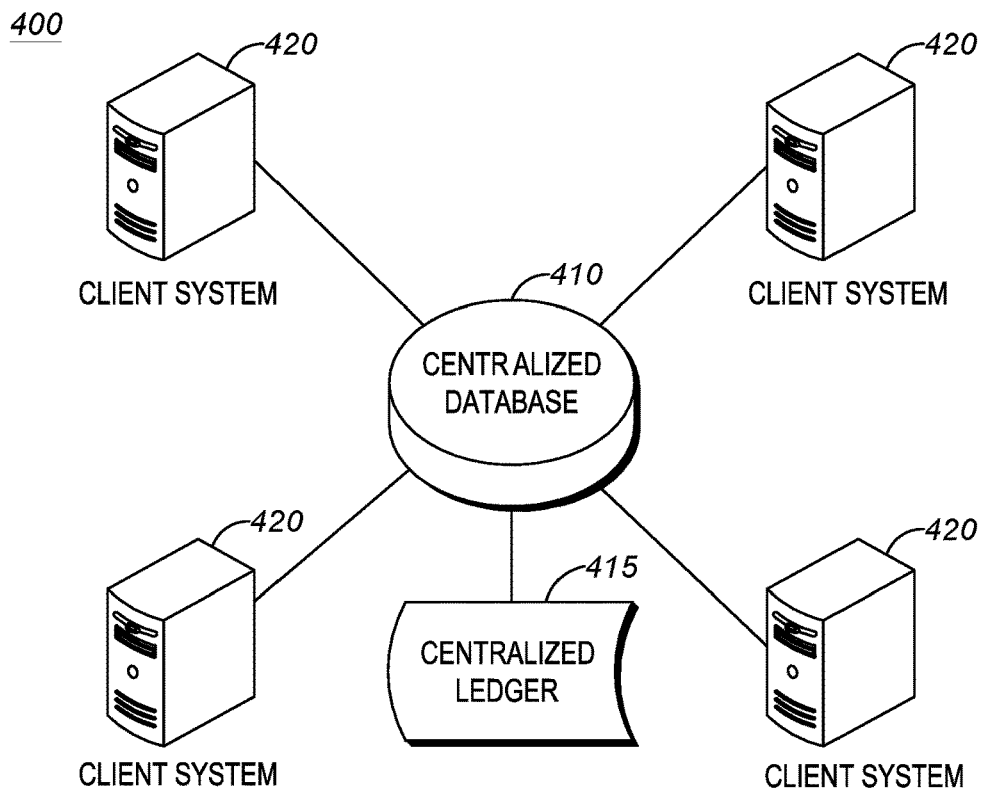
FIG. 4 is a system diagram of a centralized database comprising a centralized ledger.

FIG. 4 is a symbol diagram illustrating a centralized database system 400 that may comprise a centralized database 410 that hosts a centralized ledger 415 or other centralized data. The centralized database 410 may be in operative communication over a network with one or more client systems 420 and is configured to allow the client systems 420 to access and interact with the data stored in the centralized ledger 415. Implementing a ledger on a centralized database for agency, personnel, incident, or other types of data poses a number of technical challenges. For instance, a centralized database 410 may be a single point of failure; if the centralized database 410 suffers any type of data loss or corruption or otherwise becomes unavailable (e.g., the database is offline or has been damaged), none of the client systems 420 may be able to access a full verified copy of the data within the centralized ledger 415. Furthermore, the data within centralized ledger 415 may be vulnerable to malicious or improper manipulation, as the centralized database 410 may serve as a single point of attack. Therefore, there is a need for a more secure and resilient way to validate, store, and manage data to maintain accurate copies of validated data (e.g., by ensuring that only information that is validated is allowed to be added to the ledger), and in order to resist unauthorized or unexpected changes to the agency, personnel, incident, or other types of data stored in a database as well as avoid centralized server downtimes.

Figure 5:
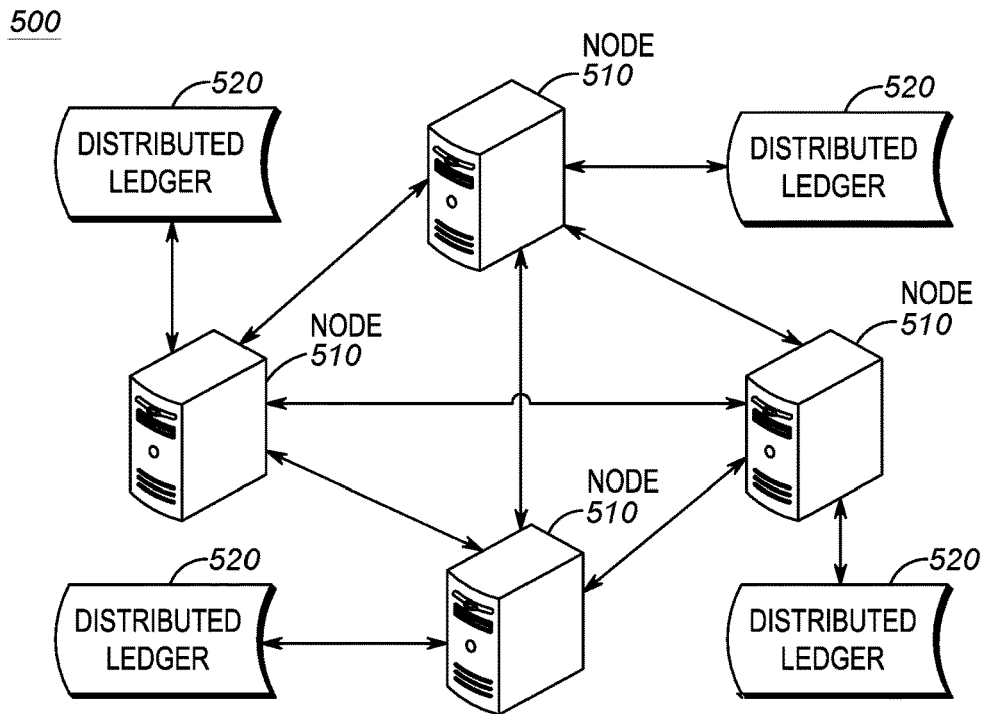
FIG. 5 is a system diagram of a distributed electronic ledger hosted on a plurality of nodes, in accordance with some embodiments.

FIG. 5 is a symbol diagram illustrating a distributed electronic ledger system 500 comprising a distributed ledger 520 stored in a decentralized manner across a plurality of nodes 510, in accordance with some embodiments. In some embodiments, the distributed ledger 520 may be a blockchain. Each node 510 may be a computing device, that may be in operative communication with the other nodes 510 over a network, and each node 510 may host a complete copy of the distributed ledger 520. In this regard, the nodes 510 may be part of an agency's infrastructure (e.g., the agency's distributed network of servers, databases, computers, mobile devices, sensors, equipment, and other electronic resources) or part of a cloud computing cluster used and/or operated by the agency. It should further be noted that some of the communication devices as seen in FIGS. 1-3, in addition to providing data that may be stored in the distributed ledger, may also function as "nodes" in the distributed ledger. Further, and although not illustrated in FIG. 5, each of the nodes 510 may additionally have access to a centralized database 410 in a same or similar manner to that illustrated in FIG. 4.

When additional data records are proposed to be added to the distributed ledger 520, each of the nodes 510 perform a validation check on the proposed additional data records either using hard-coded validation check mechanism or by executing chaincode or a smart contract containing the validation check mechanisms, and thereby come to a consensus, via a consensus algorithm, whether the proposed data record should be added to the distributed ledger 520. Once the proposed data record has been validated through the consensus algorithm, the proposed data record is added to each of the distributed ledgers 520 across all of the nodes 510.

In some embodiments, the distributed ledger 520 allows data records to be appended but does not allow for direct modification of existing data records or any of the other data or metadata existing within the distributed ledger (e.g., blocks in a blockchain). In other embodiments, the distributed ledger 520 allows data records to be directly modified, but maintains a history of previous data record versions and the modifications that were made. In this way, the distributed ledger 520 may comprise all of the data records written to it since its creation. If a particular node 510 were to become unavailable (e.g., due to being offline, hardware failures, security breaches, and the like), the remaining nodes 510 will remain available to host a verified copy of the distributed ledger 520. Furthermore, if data records within the distributed ledger 520 hosted on a particular node 510 were to be deleted, modified, or otherwise compromised, the remaining nodes 510 may serve as references to determine the true version of the distributed ledger 520. In some embodiments, a compromised node 510 may be taken offline such that the corrupted ledger is inaccessible. In other embodiments, the compromised node 510 may automatically correct its copy of the distributed ledger 520 based on the distributed ledger 520 stored on the remaining nodes 510 via a consensus mechanism.

Figure 6:
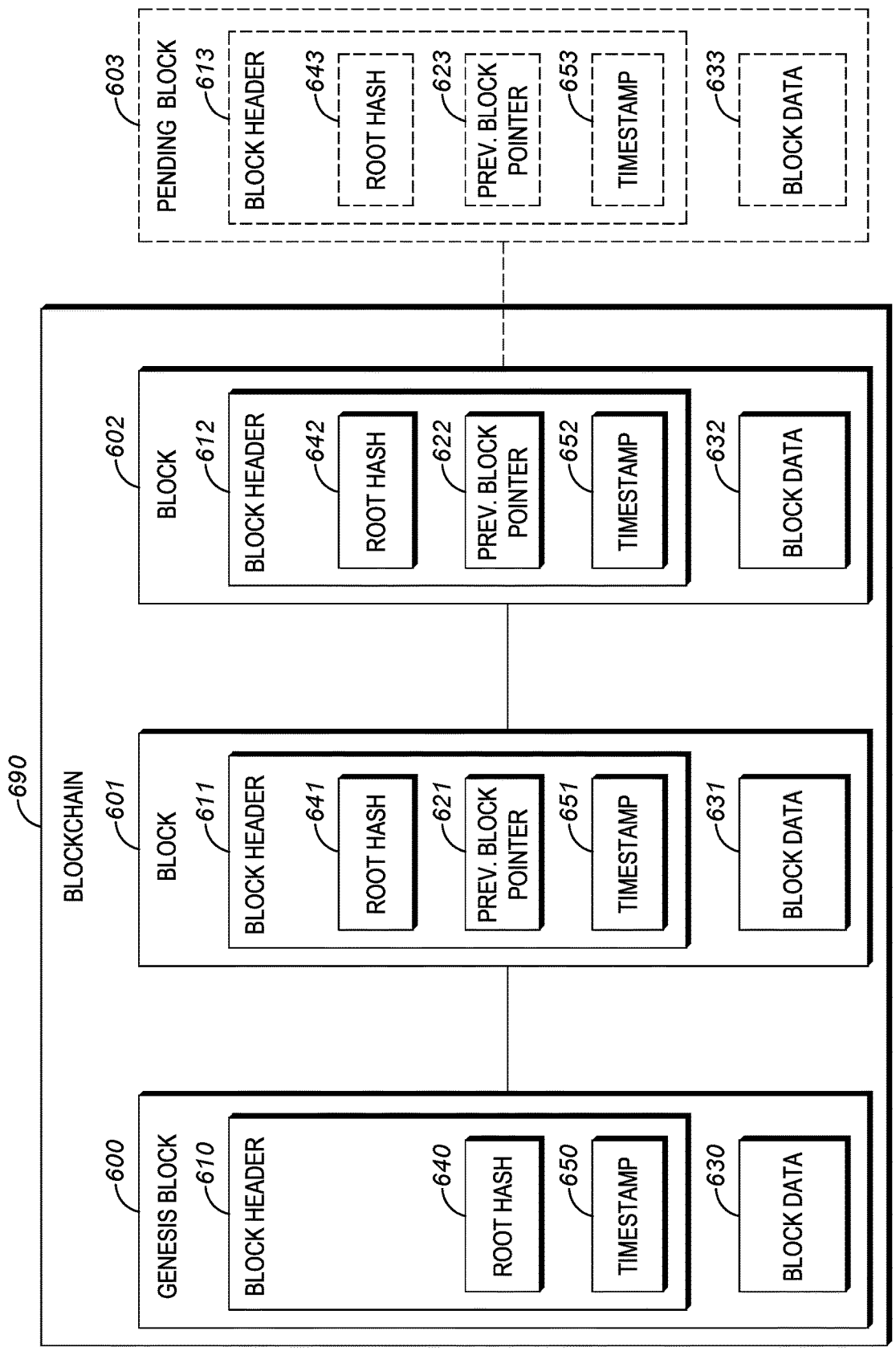
FIG. 6 is a block diagram illustrating data and metadata structures within an example blockchain distributed electronic ledger, in accordance with some embodiments.

As noted herein, a distributed ledger may take the form of a blockchain. In this regard, FIG. 6 is a block diagram illustrating data structures of a blockchain 690 in detail, in accordance with some embodiments. In particular, FIG. 6 6 depicts a plurality of blocks 600, 601, and 602 contained in a blockchain 690, in addition to a proposed block 603 to be appended to the last block 602 in the blockchain. The blockchain 690 may comprise a genesis block 600 that serves as the first block in the blockchain. The genesis block 600, like all other blocks within the blockchain 690, comprise a block header 610 and block data 630. Each block data 630 within a block may contain a wide range of different types of data records. For instance, in some embodiments, the block data 630 may comprise electronic files such as documents, media files, and the like. In other embodiments, the block data 630 may contain one or more transactions, which may be defined as an event, occurrence, or state that an agent and/or agency wishes to record in the distributed ledger. In yet other embodiments, the block data 630 may comprise other data structures, such as pointers that provide a link to a file that may exist outside of the blockchain. Such a file may exist locally, within another computing system on the network, or on a remote computing system. In some embodiments, pending data records may be stored in a memory pool to be added to the block data 630 once the pending data records have been validated by the system.

The block header 610 may comprise various types of metadata regarding the block data 630. In some embodiments, the block header 610 may comprise a root hash 640, which is a hash derived from the block data 630. In some embodiments, the root hash 640 may be a Merkle root hash, wherein the root hash 640 is calculated via a hash algorithm based on a combination of the hashes of each transaction within the block data 630. In this way, any changes to the data within the block data 630 will result in a change in the root hash. The block header 610 may further comprise a timestamp 650 that indicates the time at which the block was written to the blockchain 690. In some embodiments, the timestamp may be a Unix timestamp. In some embodiments, particularly in blockchains utilizing a PoW consensus mechanism, the block header 610 may comprise a nonce value and a difficulty value. The nonce value may be a whole number value that causes the hash of the block header 610 to satisfy the difficulty level of the cryptographic puzzle as defined by the difficulty value. For instance, the consensus mechanism may require that the resulting hash of the block header 610 metadata falls below a certain value threshold (e.g., the hash must start with a certain number of zeroes, as defined by the difficulty value).

A subsequent block 601 may be appended to the genesis block 600 to serve as the next block in the blockchain. Like all other blocks, the subsequent block 601 comprises a block header 611 and block data 631. Similarly, the block header 611 may comprise a root hash 641 of the data within the block data 631 and a timestamp 651. The block header 611 may further comprise a previous block pointer 621, which may be a hash calculated by combining the hashes of the metadata (e.g., the root hash 640, timestamp 650, and the like) within the block header 610 of the genesis block 600. The block pointer 621 may be used to identify the previous block (i.e., the genesis block 600) in the blockchain 690. Of course, other types of previous block pointers and other methods of generating and storing a hash of a previous block could be used in a subsequent block in other types of distributed ledger implementations.

A subsequent block 602 may be appended to the block 601, where the subsequent block 602 also comprises a block header 612 and block data 632. Similarly, the block header 612 may comprise a root hash 642 of the data within the block data 632 and a timestamp 652. The block header 612 may also comprise a previous block pointer 622 that points to the previous block 601, where the previous block pointer 622 may be a hash value derived by combining the metadata within the block header 611 (including the previous block pointer 621) into a hash algorithm. The block pointer 622 may identify the previous block 601 in the blockchain 690.

In this way, the values of each previous block pointer 621, 622 within the blockchain are dependent on the hashes of the block headers of all of the previous blocks in the chain; if the block data within any of the blocks is altered, the block header for the altered block as well as all subsequent blocks will result in different hash values, i.e., the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. In other words, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the risk of improper alteration of data records.

A pending block 603 or "proposed block" may be submitted for addition to the blockchain. The pending block 603 may comprise a block header 613, which may comprise a root hash 643, a previous block pointer 623 that points to the block 602, a timestamp 653, and block data 633. Once a pending block 603 is submitted to the system, the nodes within the system may validate the pending block 603 via a consensus algorithm. The consensus algorithm may be, for instance, a proof of work mechanism, in which a node determines a nonce value that, when combined with a hash of the block header 612 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 612 is included in the block header 613 of the pending block 603 as the previous block pointer 623. The block header 613 may further comprise the root hash 643 of the block data 633 that may be calculated based on the winning solution. The pending block 603 is subsequently considered to be appended to the previous block 602 and becomes a part of the blockchain 690. A timestamp 653 may also be added to signify the time at which the pending block 603 is added to the blockchain 690. In other embodiments, the consensus mechanism may be based on a total number of votes submitted by the nodes of the blockchain 690, e.g., a PBFT consensus mechanism. Once a threshold number of votes to validate the pending block 603 has been reached, the pending block 603 may be appended to the blockchain 690. In such embodiments, nonce values and difficulty values may be absent from the block headers.

The distributed ledger as described herein may be an incident-based distributed ledger that may store data records relating to incidents that one or more agencies (e.g., public service or utilities agencies) may be tasked to resolve. In such embodiments, the distributed ledger may take various different forms. For instance, an incident-based distributed ledger may be created for each incident. In other words, each incident-based distributed ledger may comprise one or more incident-related data records associated with a particular incident. In an exemplary embodiment, an incident-based distributed ledger may be associated with a particular traffic accident. In such an embodiment, the incident-based distributed ledger may be managed by one or more agencies (e.g., a police department, a fire department, and the like) and may comprise all of the incident-related data records associated with the traffic accident (e.g., incident-related data record that creates the incident, incident-related data records indicating the incident's status, incident-related data records containing evidence data, and the like). In some embodiments, the incident-based distributed ledger may be configured to allow incident-related data records to be written to the incident-based distributed ledger while the incident is still pending. In such embodiments, once an incident-related data record indicating the resolution of an incident is written to the incident-based distributed ledger, additional incident-related data records may be prevented from being written to the incident-based distributed ledger.

In some embodiments, an agency distributed ledger may be created for each agency, such that the agency distributed ledger comprises all of the data records related to a particular agency. In an exemplary embodiment, an agency distributed ledger may be created for a fire department. In such an embodiment, the agency distributed ledger may comprise all of the data records relating to the fire department, such as incident-related data records relating to particular incidents, incident-related data records that assign attributes to incidents and/or resources within the fire department, data records that are not related to particular incidents, and the like. In some embodiments, the agency distributed ledger may be configured to allow multiple agencies (e.g., a police department, a regulatory agency) to view and validate data records on the agency distributed ledger, but only allow a particular agency (e.g., the fire department) to submit proposed data records to the agency distributed ledger.

In other embodiments, a jurisdictional distributed ledger may be created for one or more agencies within a particular jurisdiction. For example, a jurisdictional distributed ledger may be created for a number of statewide agencies (e.g., police department, fire department, medical department) within a particular state (e.g., Nevada). In such embodiments, the jurisdictional distributed ledger may comprise the data records associated with the various state-based agencies. In some embodiments, the data records may comprise data or metadata that identify the data records and distinguish them from other data records. For instance, the data or metadata associated with a particular data record may identify the data record as a data record submitted by the police department of Nevada.

In some embodiments, at least a portion of the data records within the jurisdictional distributed ledger may be accessed and/or viewed by the agencies participating in the jurisdictional distributed ledger, while at least a portion of the data records may be encrypted (or otherwise have controlled access) such that only a particular agency (or subset of agencies) may access and/or view such portion of the data records. For example, private agency information (e.g., police officer identities) may be encrypted within the data records such that only the agency (e.g., police department) associated with such private agency information may access and/or view said data records. By way of further example, rather than being stored in the distributed ledger, private agency information may be stored in a separate access-controlled database, and relevant data records of the distributed ledger may include pointers to (and/or cryptographic hashes of) such private agency information stored in the separate access-controlled database.

In some embodiments, the distributed ledger may be a hybrid combination of two or more of the various types of distributed ledgers as described herein. For example, in some embodiments, each agency may be associated with an agency distributed ledger, where the data records within the agency distributed ledger may comprise embedded links to one or more incident-based distributed ledgers.

In some embodiments, the distributed ledger may be a hybrid public/permissioned distributed ledger that comprises public incident-related data records and private incident-related data records. In such embodiments, the hybrid public/permissioned distributed ledger may be configured to allow members of the public to access and/or view at least a portion of the incident-related data records (e.g., public incident-related data records or public portions of incident-related data records) within the distributed ledger, while other incident-related data records or portions of incident-related data records (e.g., private incident-related data records or private portions of incident-related data records) may be encrypted (e.g., protected by other access controls) such that they may only be accessed by authorized users. In an exemplary embodiment, a police department may host a hybrid public/permissioned distributed ledger in which the public may access certain public portions of incident-related data records (e.g., anonymized police officer identifiers, incident titles or locations, etc.) while only authorized users (e.g., users or agents within the police department) may access the private portions of incident-related data records (e.g., officer identities, suspect identities, etc.) and/or validate incident-related data records (e.g., participate in the consensus). Private portions of incident-related data records may be encrypted. In some embodiments, private information may be stored in a separate access-controlled database, and the relevant incident-related data records of the distributed ledger maintain pointers to (and/or cryptographic hashes of) such private information. In additional embodiments, private incident-related data records may be contained in one or more private, permissioned distributed ledgers, public incident-related data records may be contained in a public distributed ledger, and, where applicable, such public incident-related data records may include pointers to (and/or cryptographic hashes of) relevant private incident-related data records.

In some embodiments, a second distributed ledger may be used in conjunction with the distributed ledger. For instance, in some embodiments, the distributed ledger may comprise one or more data records that have not yet been validated by the nodes (e.g., the distributed ledger allows proposed data records to be written regardless of validity). Once the nodes have performed validation of the proposed data records within the distributed ledger, the nodes may write a copy of the validated proposed data records to the second distributed ledger. In this way, the distributed ledger may comprise all proposed data records submitted to the distributed ledger, while the second distributed ledger comprises only validated proposed data records. In other embodiments, the second distributed ledger may comprise indications of validity (e.g., data records) that refer back to proposed data records within the distributed ledger and indicate whether the proposed data records are valid or invalid. In this way, the distributed ledger comprises all proposed data records submitted to the distributed ledger while the second distributed ledger comprises indications of validity (with pointers to valid proposed data records within the distributed ledger) instead of full copies of the validated data records.

The distributed ledger as described herein may store various types of data records that may relate to public safety (e.g., police, fire, or medical) or enterprise (e.g., utilities, oil/gas, electric, or business) agencies. For instance, as noted above, the data records may include "incident-related data records," or data records that are associated with a particular incident (e.g., an occurrence of an event that an agent within a particular agency has jurisdiction and must respond to). Accordingly, incident-related data records may be data records that define an incident, assign resources to an incident, open or close an incident, or the like.

The distributed ledger may also include "attribute data records," or data records that define attributes of individuals, agents, resources, agencies, incidents, or the like. Said attributes may include locations, statuses, roles, skills, and the like. In some embodiments, an attribute data record may be associated with an incident (e.g., the attribute data record may also be an incident-related data record). For instance, such an attribute data record may define valid incident types that may be assigned to a particular incident. In other embodiments, an attribute data record may not be associated with a particular incident (e.g., an attribute data record may define an agent's role without regard for a particular incident or may include other information not related to a particular incident, such as available equipment, equipment status or location, time of day or day of week, among other information).

The distributed ledger may also include "validation response data records," or data records that indicate a response provided by the nodes of the distributed ledger with respect to the validity of a proposed data record. In some embodiments, the validation response may be a validation vote data record that indicates whether a node has voted "yes" or "no" to validate a proposed data record. In some embodiments, the validation vote data record may be an intra-agency validation vote data record, which indicates whether a node within a single agency has voted "yes" or "no" to validate a proposed data record submitted by a node or agent with the agency.

The distributed ledger may also include "approval data records," or data records that indicate that an agent within an agency (e.g., an administrator/admin such as a project manager, dispatcher, CAD operator, or on-scene commander) has approved or rejected a proposed data record submitted by another agent within the agency (e.g., a data record submitted by an individual who claims to have a particular skill set). In such embodiments, the validity of said proposed data record may depend on the approval data record submitted by the administrator or other agent within the agency.

The distributed ledger may also include "responsive data records," or data records that indicate the validity of a proposed data record submitted by an originating agent within an agency. Responsive data records may include the results of one or more validation checks based on intra-agency validation criteria performed by one or more second agents within the agency. If the responsive data record indicates that the proposed data record has satisfied the intra-agency validation criteria, the responsive data record may be considered to approve the proposed data record. Conversely, if the responsive data record indicates that the proposed data record does not satisfy the intra-agency validation criteria, the responsive data record may be considered to reject the proposed data record.

Arranging and using a digital ledger in a distributed and decentralized manner across multiple nodes in the manner described herein provides a number of technical advantages over using a centralized ledger hosted on a centralized database. For example, because multiple nodes may host a full copy of the distributed ledger, the system does not have a single point of failure, and thus the distributed ledger may continue to be accessible even if one or more nodes fail or are compromised. Furthermore, in embodiments in which the distributed ledger is a blockchain, a blockchain structure may help to ensure that the data records in a digital ledger are practically immutable, thereby greatly increasing the security and integrity of the data stored in the digital ledger. Various digital ledger structures and validation checks as described herein may also provide additional trust in the initial and continued validity of data records stored or referenced by the distributed ledger, and provides for an improved method of entering, storing, and tracking intra and/or inter-agency data records across geographically dispersed networks.

Figure 7:
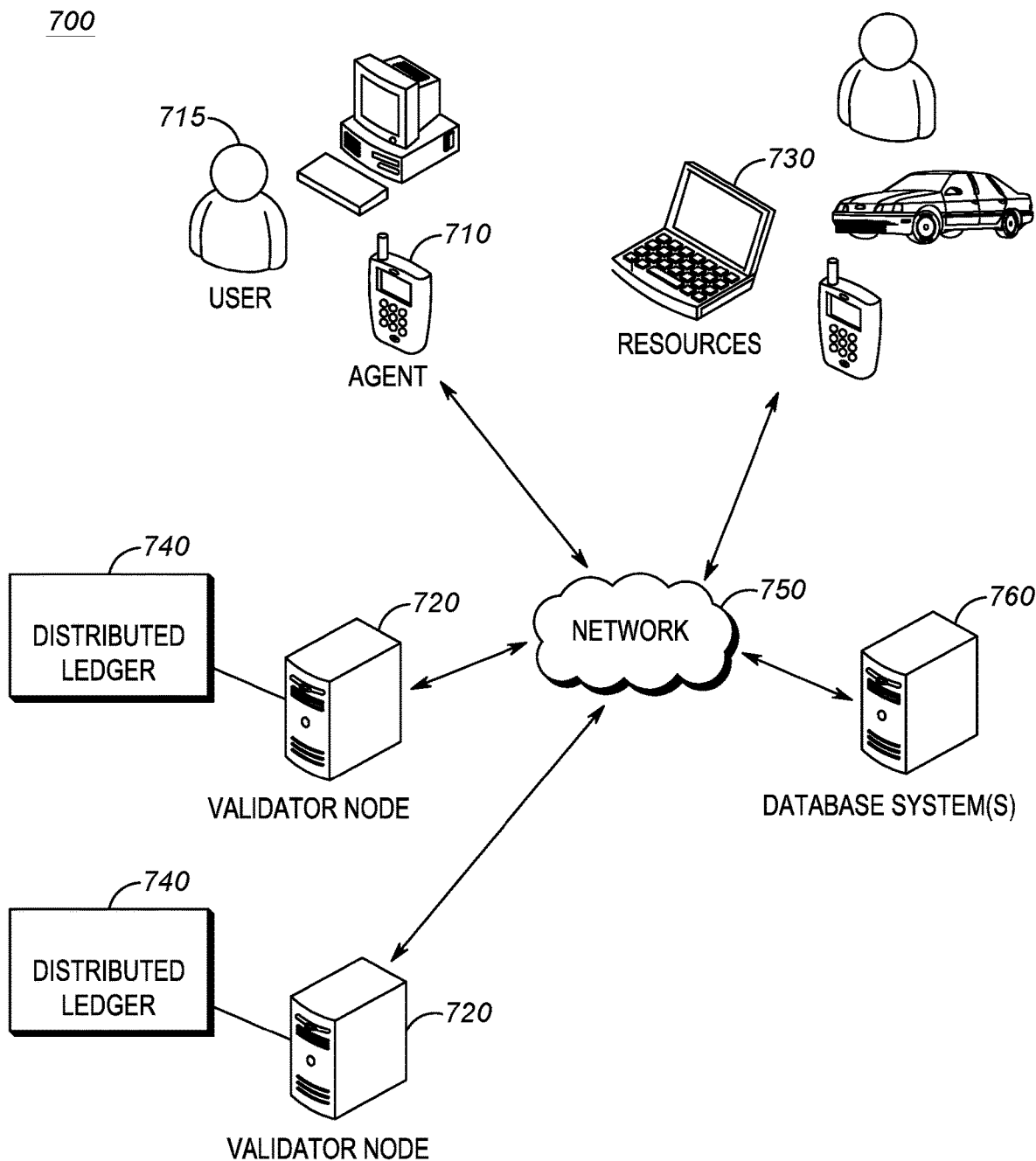
FIG. 7 is a system diagram illustrating an operating environment for a distributed electronic ledger system, in accordance with some embodiments.

3. System and Processes for Appending and Validating Incident-Related Data Records in a Distributed Electronic Ledger FIG. 7 is a symbol diagram illustrating an operating environment 700 for a distributed ledger system, in accordance with an embodiment. The operating environment 700 may comprise one or more validator nodes 720 in operative communication with one another over a network 750, where the validator nodes 720 host the distributed ledger. In some embodiments, the validator nodes 720 may be hosted and operated by an agency that wishes to use the distributed ledger system to store and manage incident-related data records or other types of data records. In other embodiments, one or more of the validator nodes 720 may at least partially be hosted and/or operated by a third party entity or agency. In some embodiments, each validator node 720 hosts a complete copy of the distributed ledger 740. The nodes 720 together with the distributed ledger 740 may be referred to herein as the "distributed ledger system." In some embodiments, the distributed ledger is a permissioned blockchain (e.g., only authorized devices validate incident-related data records). The validator nodes 720 may further be in operative communication with one or more agents 710. The components of the operating environment 700 as shown in FIG. 7 may also be represented by one or more components as seen in FIGS. 1-3. For example, in some embodiments, the nodes 720 may be the communication devices 200 in FIG. 2 or FIG. 3. In other embodiments, the nodes 720 may be computing systems within the infrastructure RAN 152 in FIG. 2 or the cloud computing cluster 162 in FIG. 1. Furthermore, the network 750 may be the IP network as seen in FIG. 1.

The distributed ledger of FIG. 7 may be any type of distributed ledger (including a hybrid distributed ledger) as set forth earlier. For example, the distributed ledger may be an agency distributed ledger which is specific to a particular agency. In such embodiments, the distributed ledger may contain various types of data records (e.g., incident-related data records, attribute data records, or other types of data records) that pertain to the particular agency's workflow, status, attributes, and the like. In other embodiments, the distributed ledger may be an incident-based distributed ledger that contains all of the data records related to a particular incident (e.g., incident-related data records). It should be noted that the nodes 720 of an agency may host multiple distributed ledgers (e.g., an agency may host an agency distributed ledger to store agency-related data as well as an incident-based distributed ledger for each incident to which the agency has been tasked to resolve).

"Agent" as used herein may refer to a user 715 (e.g., an individual within the agency) within a particular agency's control. In such embodiments, the user 715 may be the user 102 as seen in FIG. 1. In some embodiments, the agent 710 may also be an automated agent (e.g., a particular software program running on a computing device or a bot) which may be configured to interact with the distributed ledger. Each agent may utilize a computing device (e.g., a communication device 200 as described above) to interact with the distributed ledger system. The agent 710 may submit proposed incident-related or other data records to be added into the distributed ledger, and may further be authorized to access previously written data records on the copies of the distributed ledger 740 stored on the validator nodes 720. In some embodiments, the proposed data records may pertain to a particular incident, such as a traffic accident, public disturbance, natural disaster, utilities-related issue or hazard, and the like. For instance, the proposed data record may contain an allocation of resources (e.g., responders such as police officers, firefighters, medical staff, utilities workers, equipment, etc.) to a particular incident. In some embodiments, the proposed incident-related data records or other data records (e.g., attribute data records) may pertain to particular individuals or other resources within the agency.

The validator nodes 720 may further be in operative communication with one or more resources 730. "Resources" as used herein may refer to an intangible or tangible objects or individuals that the agency may use to perform various functions of the agency. Accordingly, "resource" may refer to various types of equipment such as portable devices such as laptops, mobile cameras (e.g., body cameras or dash cameras), vehicles, drones, breathing apparatus, infrared imagers, smartphone/smart devices, and the like. For example, a communication device 200 as described above may constitute a resource 730. In other embodiments, the vehicle 132 or the user 102 as seen in FIG. 1 may be a resource 730. Said equipment may further include static structures such as power lines, water lines, power plants, and the like, which allow the agency to perform its functions. In some embodiments, a resource may also be an individual such as a responder, where the responder may be a police officer, medical personnel, public safety officer, utility worker, and the like. In such embodiments, an individual within the agency may simultaneously be a resource (e.g., a responder may be assigned to an incident's location) and an agent (e.g., the responder may upload incident data to the distributed ledger system while the responder is located at the scene of the incident). The data submitted to the distributed ledger system by the various agents and/or resources may comprise, for instance, video, image, and/or audio data, text or document data, and the like, where the submitted data are associated with an incident. In some embodiments, other resources may also serve as an agent. For instance, a police vehicle as described in FIG. 1 may be a resource that is assigned to a particular incident. That said, a police vehicle equipped with a communication device that is configured to automatically submit incident-related data records (e.g., dashcam footage) to the distributed ledger may also be considered an agent.

The operating environment may further comprise one or more database systems 760 in operative communication with the other devices in the distributed ledger system. In some embodiments, the database system 760 may be the one or more databases 164 as seen in FIG. 1. In some embodiments, a database system 760 may comprise data (e.g., evidence related to an incident) obtained from one or more resources 730 that may or may not also be stored on the distributed ledger. For example, the distributed ledger system may determine that a video file having a large file size should be stored on the database system 760 in order to prevent data bloat on the distributed ledger. In such embodiments, an incident-related data record may be appended to the distributed ledger in which such incident-related data record contains a digital fingerprint of the file as well as a pointer to the file stored on the database system 760, rather than a copy of such file. The digital fingerprint may be a cryptographic hash of the large data file such that agents 710 may compare a hash calculated from the large data file on the database system 760 with the digital fingerprint. In this way, the distributed ledger system provides users 715 with a way to access large data files and verify that the large data files are unmodified originals, while simultaneously preventing the computing inefficiencies associated with storing large data files on the distributed ledger.

It should be understood by those skilled in the art that, although the systems and devices depicted herein may be represented as a single unit, said systems and devices may comprise a plurality of separate systems and/or devices. It should be further understood that the computing devices as depicted in FIG. 7 (e.g., the nodes 720, computing devices employed by the agents 710, or various resource 730 devices such as body cameras, dash cameras, laptops, smartphones, etc.) may be, for example, the communication devices as described with respect to FIGS. 1-3. In addition, one or more of the database systems 760 may be one or more of the databases 164 described above.

In some embodiments, an incident-related data record may comprise metadata or other information regarding an item, an action taken, a person, or an article of physical evidence associated with an incident. The metadata may comprise a description of the item, action, person, or article of physical evidence (e.g., characteristics such as appearance, size, weight, etc.) and perhaps a location at which the physical evidence was originally viewed or is now physically stored. In an exemplary embodiment, a responder (e.g., a police officer) may submit a proposed incident-related data record that contains metadata regarding a piece of evidence that the responder has collected from an incident site (e.g., a pair of shoes associated with a suspect associated with a particular incident). The metadata may comprise information about the characteristics of the shoes (e.g., color, size, shoe type, materials, condition, etc.) as well as the location in which the shoes are stored (e.g., locker number, facility address/location, etc.). The metadata may include information regarding chain of custody for the physical evidence (e.g., the responder transferred the physical evidence to an individual in charge of placing the evidence in physical storage). In some embodiments, the metadata may point to an image or video file stored at a centralized on-premises agency server or stored at a cloud-based storage location that contains digital images of the shoes. The metadata may be located in a single incident-related data record or divided over multiple incident-related data records (e.g., multiple incident-related data records created over time as the physical evidence is collected, examined, and transferred from the scene of an incident to physical storage). In this way, the distributed ledger system may provide agencies with a reliable way to store incident-related data and/or metadata regarding both electronic and physical evidence associated with an incident.

Figure 8:
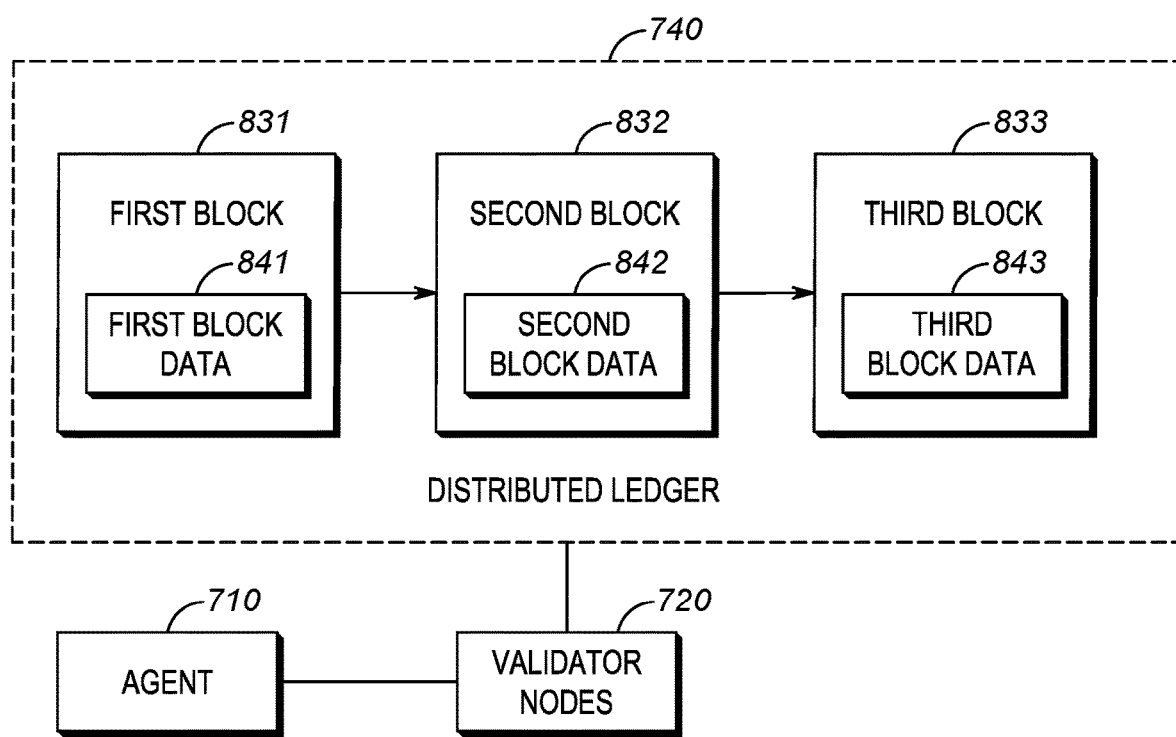
FIG. 8 is a block diagram illustrating the data structures within the distributed electronic ledger system in more detail, in accordance with some embodiments.

FIG. 8 illustrates logical structures within the distributed ledger system, in accordance with some embodiments. In particular, the system may comprise a distributed ledger hosted on a plurality of validator nodes 720, which may each host a complete copy of the distributed ledger 740. For the purposes of FIG. 8, the distributed ledger is depicted as a blockchain ledger, although other types of distributed ledgers are within the scope of the present disclosure. For instance, in some embodiments, the incident-related and other data records described herein may be stored in one or more separate databases (e.g., a CouchDB database) and the data records included in the distributed ledger may indicate any changes (e.g., new data records or changes to existing data records, new hashes of new or modified existing data records, etc.) to said separate database(s). In such embodiments, the nodes 720 may access the data within the separate database to validate new incident-related data records, and the distributed ledger may be used for error-checking and/or verification purposes.

In embodiments in which the distributed ledger is a blockchain, the distributed ledger may comprise a plurality of blocks in an ordered sequence. For instance, the each copy of the distributed ledger 740 may comprise at least a first block 831, a second block 832, and a third block 833 linked in order, where the first block 831 comprises first block data 841, the second block 832 comprises second block data 841, and the third block 833 comprises third block data 843, and so on. For illustrative purposes, the first block 831 may be referred to as the "genesis block." In some embodiments, the agent 710 may submit proposed incident-related or other data records to the distributed ledger. In some embodiments, the agent 710 may be a user 715 or individual within an agency, such as an admin, manager, responder, dispatcher, and the like. In other embodiments, the agent 710 may be an automated agent under the agency's control, such as a bot or software program.

The block data 841, 842, 843 may contain various types of incident-related data records and/or other data records (e.g., attribute data records) related to the agency. The incident-related data records may comprise, for instance, incident-related text or document data, media data, transaction data, and the like. In some embodiments, the incident-related data records are associated with various functions and/or aspects of the agency. Accordingly, the incident-related data or other data records (e.g., attribute data records) records may contain information about assignment of roles to agents within the agency with respect to a certain incident, where the roles may include administrators, responders, dispatchers, and the like. For instance, an individual may be assigned a particular skill set (e.g., heavy machinery operating license, chemical expertise, high-stress negotiation skills, etc.). The incident-related data records may further include incident data such as the incident status (e.g., newly opened, ongoing, incident phases, resolution, disposition, etc.) as well as incident attributes (e.g., type of incident, requirements of the incident, resources assigned to or involved in the incident, etc.). For instance, an incident-related data record may indicate that an incident that involves a broken power line may require a responder with certain electrical hazard management skills. Attribute data records may include an assignment of roles, ranks, user status, equipment, equipment status, or other parameters to a particular agent or resource within the agency. Attribute data records may contain information about assignment of roles to agents within the agency (but not necessarily with respect to a particular incident).

As described above, the agent 710 may submit a proposed data record to the distributed ledger. The proposed record may relate to a workflow, an object, an entity, or an action relating to an incident over which the agent and agency has jurisdiction for responding. For instance, the proposed data record may be submitted by an admin and may involve an assignment of roles, statuses, and/or attributes to an agent or resource relative to an incident or to the incident itself. An agent, such as a responder, may further submit proposed incident-related data records that involve an assignment of resources (e.g., responders, equipment, etc.) to an incident.

Once a proposed data record has been submitted by an agent 710, the validator nodes 720 may run a series of validation checks or execute chaincode or implement a smart contract with logic to run a series of validation checks, based on the content of the proposed data record, parameters associated with agent 710, and/or parameters associated with the incident. These validation checks may further rely upon content of data records already stored in the distributed ledger, and/or information or attribute records stored at a centralized on-premises server or cloud-based data store (e.g., an employee information database) and that is associated with the agent or agency to which the agent belongs. For example, if the proposed data record concerns the addition of a new person into the agency and an assignment of a role to the new person, the validation check may cause the nodes 720 to verify that the submitting agent has been identified as an admin in a previous data record. As an example, the nodes may search the block data 841, 842, 843 within the blocks 831, 832, 833 within the distributed ledger to search for a data record in which the submitting agent has been assigned an admin role. In, an admin role is assigned in a data record within the first block data 841 in the first block 831 (i.e., the genesis block).

In some embodiments, the incident-related and other data records described herein may be stored in one or more separate databases (e.g., a CouchDB database) and the data records included in the distributed ledger may indicate any changes (e.g., new data records or changes to existing data records) to said data records in separate database(s). In such embodiments, the nodes 720 may access the data records within the separate database to validate new data records, and the distributed ledger may be used for error-checking and/or verification purposes.

In some embodiments, the validation checks may include verifying that the proposed data record and/or the user (e.g., agent) submitting the proposed data record has certain attributes. For example, the system may conduct a validation check to ensure that the user submitting the proposed data record has been assigned a "role" or "status" that authorizes the user to submit the proposed data record based on the contents or type of the data (e.g., certain proposed incident-related data records may be validly submitted only by a user with the role of "admin" or "administrator"). In this way, the agency may use the distributed ledger system to provide access control based on a user's status relative to an incident.

In some embodiments, the agency may assign the role of "administrator" to an individual (e.g., agent) who may have the ability to create new incident records (e.g., "open" a record about an incident such as a traffic accident, public disturbance, medical emergency, fire, broken water meter or power line, etc.), assign attributes (e.g., skills, experience, etc.) or roles (e.g., dispatchers, responders, administrators, managers, etc.) to various agents and/or incidents within the agency. Accordingly, the system may write a data record to the distributed ledger that indicates that a particular user or agent has been assigned the role of "admin." Once said data record has been appended to the distributed ledger, the agent may subsequently submit proposed data records (e.g., incident-related data records or other types of data records such as attribute data records), which may require the agent to be an admin.

To further illustrate, the admin may wish to designate an incident as requiring a certain expertise (e.g., chemical expertise), designate certain attributes (e.g., chemical expert) to a particular responder in the agency, then subsequently assign the chemical specialist to the incident (e.g., a chemical spill). In such embodiments, the admin may submit a proposed data record that assigns an attribute of "hazardous chemical expert" to the particular responder within the agency. The admin may further submit a proposed attribute data record that assigns an attribute (e.g., requires chemical expertise) to a particular incident. Finally, the admin may submit a proposed incident-related data record that assigns the chemical expert responder to the incident. Said proposed data records and incident-related data records may be evaluated via a consensus mechanism by the nodes in the system, which may search the history of the distributed ledger to find the data record that indicates that the agent is an "admin," which in turn indicates that the admin agent is authorized to assign attributes to responders and/or incidents. The nodes may additionally or alternatively perform one or more incident-related validation checks (outside of consensus mechanisms) that verify that the requirements as detailed in the incident attributes (e.g., requires chemical expertise) are satisfied by the responder assigned to the incident by the admin (e.g., the responder is a chemical expert).

In some embodiments, an agent 710 (e.g., an admin) may submit an attribute data record that assigns an agent 710 or resource 730 to a particular talkgroup associated with an incident. Said attribute data record may subsequently be used as a validation check for certain actions that may be taken by an agent 710. For example, an admin agent 710 may assign another agent 710 (e.g., a police officer responder) to a talkgroup associated with a traffic accident. If the responder submits an incident-related data record associated with the traffic accident (e.g., evidence data collected from the scene), the nodes 720 may use said attribute data record to verify that the responder has been assigned to the talkgroup associated with the traffic accident. In some embodiments, if the responder submits an incident-related data record relating to a second agent 710 at the scene, the nodes 720 may verify that both the responder and the second agent 710 are members of the same talkgroup.

The nodes 720 may run various other validation checks, such as a check to ensure that the role proposed by the submitting agent is a valid role within the system. As with most of the validation checks as detailed herein, at least some of the data used by the nodes 720 to run the validation checks may exist within previously written attribute or incident-related data records within the distributed ledger. Once the nodes 720 have performed all of the validity checks required by the proposed incident-related or other data record, in embodiments in which the validation checks are performed using a consensus algorithm, each of the nodes 720 may vote as to whether the proposed data record is valid or invalid. The vote from each node 720 may be propagated to the other nodes 720 within the network. Based on the total number of votes obtained from the nodes 720, each node 720 may then use the consensus algorithm to make the final determination as to the validity of the proposed data record. The consensus algorithm may require that a threshold number (or threshold ratio) of "yes" votes has been reached in order to find a proposed data record to be valid.

In embodiments in which the validation checks are performed by executing chaincode or smart contract logic, the nodes 720 may, through the consensus algorithm (e.g., a "proof of work" or "proof of stake" algorithm), determine whether the chaincode or smart contract logic has been correctly executed, the nodes have found the proposed data record to be valid, and/or a majority of nodes agree on the results. Based on the results of executing the chaincode or smart contract logic and perhaps also on the results of the consensus algorithm, the nodes 720 may decide on whether (and perhaps where and/or when) to add the proposed data record to the distributed ledger.

In some embodiments, only valid incident-related or other data records are written to the distributed ledger. In such embodiments, the proposed data records may be stored in a temporary memory pool to await validation before being appended to the distributed ledger. In some embodiments, the proposed data records may be processed and validated in real-time (e.g., as soon as the proposed data records are detected within the temporary memory pool). In other embodiments, the distributed ledger system may wait until the temporary memory pool or other buffer contains a threshold number of proposed data records before validating the proposed data records. If the proposed data record is found by the nodes to be valid, the proposed data record is added to the copy of the distributed ledger 740 stored at each node. If, on the other hand, the proposed data record is found to be invalid or if consensus cannot be reached, the proposed data record may be prevented from being written to the distributed ledger.

In other embodiments, all proposed incident-related and other data records may be written to the distributed ledger or a second distributed ledger regardless of validity, and thus may be written to the distributed ledger or a second distributed ledger before being validated. In such embodiments, the nodes 720 may write a subsequent incident-related data record or otherwise store an indication of validity that references the proposed data record within the distributed ledger or the second distributed ledger, where the subsequent incident-related data record or indication of validity indicates whether the consensus mechanism has indicated that the proposed data record is valid or invalid.

In still other embodiments, proposed data records may be written to a first distributed ledger before validation by the nodes 720. If the nodes 720 determine that the proposed data record is valid (e.g., through a consensus algorithm, smart contract, chaincode, or the like), the nodes 720 may then write the proposed data record (or an indicator or link thereto, indicating validity) to a second distributed ledger. However, if the nodes 720 find that the proposed data record is invalid, then the proposed data record (or indicator of validity) may not be written to the second distributed ledger (or, in some embodiments, an indication of invalidity may be written to the second distributed ledger). In this way, the distributed ledger system may produce a first distributed ledger that contains all proposed data records, whether valid or invalid, while producing a second distributed ledger that contains only validated data records (or indications of only validated records, or indications of validated and invalidated records).

In some embodiments, upon finding that a proposed data record is invalid, the nodes 720 may be configured to generate and send a notification of the proposed data record's invalidity to the submitting agent 710. The notification may contain an explanation of one or more reasons for the proposed data record's invalidity. For example, the proposed data record may have been deemed invalid if the proposed data record attempts to assign a responder to a new incident, but the responder has already been assigned to a previous incident. In this way, the system may provide the submitting agent 710 an opportunity to resubmit proposed data records to rectify mistakes in previously submitted proposed data records.

The distributed ledger system may be used by agencies to access, validate, store, and manage the incident-related data records employed to conduct incident-related functions of the agency. Depending on the proposed incident-related data records and/or the actions that the agency wishes to take within the distributed ledger, the nodes 720 may be required to perform various different validation checks on the proposed incident-related data records. The following is a description of several exemplary embodiments that illustrate the distributed ledger system in further detail. In particular, a number of exemplary proposed incident-related data records and their associated validation checks will be described in turn. It should be understood that the following examples are merely meant to illustrate a number of use cases for the distributed ledger system, and that the invention should not be construed to be limited to the examples as described herein.

In an exemplary embodiment, an agency may assign an admin role to an agent in the system. In some embodiments, the admin role is created as an attribute data record within the first block data 841 of the first block 831 (i.e., the genesis block). The nodes 720 may access agency data on an on-site agency server or a cloud-based agency data store (e.g., an employee information database) to perform validation checks to ensure the validity of the assignment of the admin role to a particular agent. For example, the nodes 720 may verify that the agent to be assigned the admin role is an active member of the agency. The nodes may further verify that the agent has a particular title within the agency (e.g., systems administrator). In some embodiments, the nodes may also verify that one or more members of the agency have provided authorization to assign the admin role to the agent. For instance, in some embodiments, the admin role may be assigned only by express authorization by one or more department heads.

Subsequently, the agent who has been assigned the admin role may submit a proposed data record into the system (e.g., a new employee of the agency). Said proposed data record may include a unique identifier (e.g., a public key) that is associated with the identity of the person. The nodes 720 may then perform a validation check to ensure that the submitting agent of the proposed data record that adds a new person into the system has been submitted by an individual with the role of "admin." The nodes 720 may then search the records within the distributed ledger (or, in some embodiments, a centralized on-premises agency server or cloud-based agency data store) for a data record that assigns the admin role to the agent. If the nodes 720 are able to locate the data record designating the agent as an admin (in this example, within the genesis block 831), the nodes 720 may find that the proposed data record to add a new person is valid.

The admin may subsequently submit a proposed attribute data record that associates a role to an individual within the agency (e.g., the admin assigns the role of "responder," "dispatcher", or "admin" to an individual). The proposed data record may refer to the individual by the individual's unique identifier. The nodes 720 may then perform a validation check to verify that the submitting agent has been identified in a previous data record as an administrator. As was the case above, once the nodes 720 locate the data record indicating that the submitting agent is an admin, the nodes 720 may find that the proposed data record that assigns a role to an individual is valid. In some embodiments, the nodes 720 may further search the distributed ledger for a data record that includes a list of defined roles; if the proposed data record references a role that is not enumerated in the list of defined roles, the nodes 720 may find that the proposed data record is invalid.

In some embodiments, the nodes 720 may also perform one or more validation checks with respect to an individual (e.g., a responder to be assigned to an incident) to whom a proposed incident-related data record relates. For example, the nodes 720 may verify that the individual has been previously added (e.g., to the distributed ledger) as an employee or member of the agency, that the individual possesses the required attributes (e.g., skill, experience, etc.) for the role being assigned, and/or that the individual is located within the agency's jurisdiction or a threshold distance of the incident, the agency precinct, or the like, and/or that the individual has not been previously added to some other incident that is not closed. The nodes 720 may further verify that the individual has not been previously assigned a role that is mutually exclusive with the role as defined in the proposed incident-related data record. For instance, the entity may define the "responder" role as mutually exclusive with the "dispatcher" role with respect to a particular incident.

In some embodiments, an individual within the agency may submit a proposed attribute data record indicating that the individual has a particular skill set (e.g., chemical expertise). In one embodiment, the admin must approve the individual's claimed skill set before the proposed attribute data record is considered to be valid. Accordingly, the admin may submit an approval data record that indicates whether the admin approves or rejects the attribute data record proposed by the individual (and thus approves or rejects the claim of the skill set). The nodes 720 may then take into account the proposed attribute data record as well as the approval data record to determine the validity of the proposed attribute data record. The nodes 720 may also take into account the attributes of the individual. For example, the nodes 720 may verify that the agent's background, education, and/or experience is commensurate with the skill being added (e.g., an individual must have an advanced degree in chemistry to be assigned a "chemical expertise" attribute). The nodes 720 may further verify that the individual is a current employee or member of the agency, that the skill to be assigned does not conflict with any previously assigned attributes, and/or that the individual is not already assigned to another (un-closed) incident.

In some embodiments, a proposed data record and/or approval data record may exist in a temporary memory pool to await validation before being added to the distributed ledger. In other embodiments, the proposed data record and/or the approval data record may be written to the distributed ledger without first being validated. In still other embodiments, the proposed data record and/or the approval data record may be written to a first distributed ledger, while the nodes 720 may validate the proposed data record and/or the approval data record prior to adding them to a second distributed ledger.

In another exemplary embodiment, an agent may have previously been designated as a dispatcher (e.g., a public safety computer-assisted dispatcher or utility dispatcher) by an admin. The dispatcher may then submit proposed incident-related data records that assign various attributes to an incident. For instance, the dispatcher may submit a proposed incident-related data record that assigns an incident identifier or case identifier to a particular incident or case. The dispatcher may further assign an incident type (e.g., a fire, broken water main, etc.) and/or an incident location (e.g., a physical address, GPS coordinates, etc.) to an incident. The nodes 720 may then perform a series of one or more validation checks, as a function of one or more agent (dispatcher) attributes relative to the incident, one or more agency attributes relative to the incident, and/or one or more incident attributes, to ensure that the various attributes should be assigned to the incident, such as determining that the submitting agent has been previously identified as a dispatcher, that the incident type is a valid type, that the agency has jurisdiction over the incident location, and/or that the location of the incident is within the jurisdiction of the dispatcher. In the case of utility failures (e.g., a failed utility node or other resource), the nodes 720 may ensure that the incident location in the proposed incident-related data record is consistent with the location of the failed utility node or other resource.

In some embodiments, a dispatcher (or other agent, such as an admin or responder, commander, etc.) may submit a proposed incident-related data record to open a new incident. In such embodiments, the proposed incident-related data record may comprise a unique incident identifier that may be referred to by subsequent incident-related data records within the distributed ledger. Said incident-related data record may comprise data regarding the incident, such as the location or jurisdiction of the incident, a minimum or maximum number of responders to be assigned to the incident, and the like. In some embodiments, the dispatcher may additionally submit a proposed incident-related data record that define an incident type (e.g., a murder site, vehicle crash, broken water meter, etc.) for the new incident. The nodes 720 may then perform a validation check to verify that the agent submitting the incident-related data records has been designated as a dispatcher in a previous incident-related data record within the distributed ledger, and that the type of new incident falls within the allowed incidents types for the dispatcher to open. Such validation checks may also be based on the location of the submitting agent. For example, if the submitting agent is a responder (instead of a dispatcher), the nodes 720 may then perform one or more further validation checks to verify that (i) the responder is currently on patrol and the incident is located within the responder's assigned patrol area and/or (ii) the location of the incident is within a predefined distance of the responder's current location.

In some embodiments, an admin or dispatcher may submit a proposed incident-related data record that defines new incident types that are not already defined within the system. For example, the agency may be tasked to resolve an incident (e.g., a murder) that has not yet been defined as an incident type. In such embodiments, the admin may submit a proposed incident-related data record that relates to the creation of the new incident type (e.g., murder). The nodes 720 may perform a validation check to ensure that the agent submitting said proposed incident-related data record has the proper attributes. For instance, the nodes 720 may verify that the agent is an admin or a dispatcher. The nodes 720 may further verify that the agent's authority or jurisdiction is appropriate for the type of incident being defined (e.g., a murder is a type of felony, so the nodes 720 may verify that the admin or dispatcher has the authority to create data records related to felonies).

Once an incident-related data record related to a new incident has been created, agents and/or resource may subsequently be assigned to the incident by the dispatcher (or other authorized responder, for example). Said incident-related data record may then be used to perform validation checks on the agents and/or resource being assigned to the incident. For instance, the nodes 720 may verify that the agent to be assigned to the incident is not currently assigned to another incident, that the maximum number of assigned agents to the incident has not been reached, that the agent has the correct attributes to be assigned to the incident, and the like.

The nodes 720 may further use previously written incident-related data records to perform validation checks when agents (e.g., responders) submit proposed incident-related data records related to an incident. For instance, a responder may submit a proposed data record to upload electronic evidence to the distributed ledger. The nodes 720 may verify that the submitting agent is classified as a responder, that the submitting agent's current location (e.g., as determined by GPS) is within a threshold distance from the incident's location, that the agent is currently on patrol, and the like.

In another exemplary embodiment, the dispatcher may submit a proposed incident-related data record which contains a list of roles and/or skills that are required for a particular incident type. For example, if the incident is a hostage situation, the dispatcher may require that individuals assigned to the incident have the role of "responder" (e.g., a police officer) and may further require that the individual has a skill set in hostage negotiations. The dispatcher may subsequently submit a proposed incident-related data record that assigns a particular responder to an incident. The nodes 720 may first verify that the submitting agent is a dispatcher before validating the proposed incident-related data record that defines an incident's required roles and/or skills. The nodes 720 may further perform various validation checks with respect to the assignment of the responder to the incident. For instance, the nodes 720 may verify that the responder is available and has not already been assigned to another incident (via a same or different distributed ledger perhaps associated with a different incident), that the responder has the requisite skills for the incident (e.g., as previously stored in the distributed ledger or perhaps as stored in a centralized on-premises or cloud-based agency skills database), and that the responder's role and assignment to the incident is valid based on the incident type (e.g., via a stored mapping of incident types to required roles stored in the distributed ledger or at a centralized on-premises or cloud-based agency database).

To continue the previous example, the responder may then receive an indication of the assignment, transmit an acceptance in response, and then responsively submit a proposed incident-related data record that indicates that the responder has accepted the assignment and has updated the responder's status to "in route" to the incident. Said proposed incident-related data record may contain a timestamp of the responder's approval and/or change in status, which may be validated and added to the distributed ledger. Upon arriving at the scene, the responder may submit another proposed incident-related data record that indicates an arrival at the incident scene and updates the status of the responder to "on scene," along with a timestamp, which may be validated and added to the distributed ledger. The responder may subsequently submit one or more proposed incident-related data records that contain on-scene incident information, such as video/audio/image data, location data, sensor data, and the like, which may be validated and added to the distributed ledger. The nodes 720 may perform validation checks to ensure that sensors belonging to the responder correspond to the sensor data being submitted by the responder and that the responder arrived at the incident location prior to incident data being submitted.

Such incident information may comprise different types of evidence (e.g., electronic or physical) that the responder has collected at the incident. For instance, a police officer may collect electronic evidence such as video/audio/image data at a crime scene along with witness or suspect testimony and/or information. In some embodiments, the electronic evidence may be included in the proposed incident-related data record submitted by the responder. In other embodiments, the electronic evidence may be referenced via a pointer that indicates the location of the electronic evidence on an external database in addition to a digital fingerprint of the electronic evidence. If the evidence is physical evidence (e.g., biological or chemical samples, a murder weapon, personal effects, etc.), the proposed incident-related data record may comprise data and/or metadata regarding the physical evidence, such as a description of the evidence, the location of the evidence, a bar-code or Radio-Frequency Identification (RFID) tag associated with the evidence, the chain of custody, and the like, which may be validated and added to the distributed ledger.

Finally, the responder (or dispatcher) may submit a proposed incident-related data record that marks the case as "closed." In validating this proposed data record, the nodes 720 may verify that one or more of: the responder's public key matches the public key as set by the admin/dispatcher in a previously written incident-related data record, that the incident location as provided by the responder is within a threshold radius of the incident location as set by the admin/dispatcher in a previous incident-related data record, and that the responder is assigned to an incident prior to being allowed to close the incident. In this way, the distributed ledger is able to ensure the efficiency of the agency's workflow.

In yet another exemplary embodiment, a utility worker responder may arrive on the site of a failed piece of equipment of the agency. The responder may submit a proposed incident-related data record to access the failed equipment ID in order to read the failure messages. The responder may then perform the required maintenance on the failed equipment and update the status of the repair (e.g., equipment is back "online") and/or upload repair/replacement notes. Finally, the responder may mark the incident as "resolved" (e.g., the failed equipment has been replaced/repaired). In such embodiments, the nodes 720 may verify that the responder has been assigned to the location of the failed equipment in a prior incident-related data record before allowing the responder to access the failure messages of the failed equipment and/or post status updates of the repair or replacement.

In any of the foregoing embodiments, once an incident is marked as "closed" or "resolved," the nodes 720 may prevent further incident-related data records from being written to the distributed ledger that references the closed incident. For example, where the distributed ledger is incident-specific, no more data records may be allowed to be added to the distributed ledger. Where the distributed ledger is not incident specific, unique incident identifiers in metadata (e.g., perhaps stored in the block data of the genesis block and required to be included in any proposed new data record) may be used and, if matched, prevented from being added as an additional data record to the distributed ledger, which may be an agency-specific distributed ledger or a jurisdiction specific distributed ledger, among other possibilities.

In some embodiments, the distributed ledger system may utilize a separate centralized on-premises or cloud-based agency database system 760 to store incident data, particularly when a request to store a large data file is received. To illustrate, a responder may submit a request to include a video file associated with a particular incident. In such embodiments, the video file itself may be stored on the database system 760, while the proposed incident-related data record submitted by the responder may comprise a digital fingerprint of the video file (e.g., a hash of the video file or other tamper indicator) as well as a pointer to the video file's location within the database system 760. In this way, the system may reduce the computing inefficiencies caused by the replication of large data files within the distributed ledger but still maintain an immutable record of the video file upon creation and storage at the database system 760.

Although the foregoing examples describe the distributed ledger system within the context of individual agencies (e.g., intra-agency validation), it should be understood that the present disclosure may also be applicable to the context of validation of incident-related data records and other types of data records amongst multiple agencies (e.g., inter-agency validation).

Figure 9:
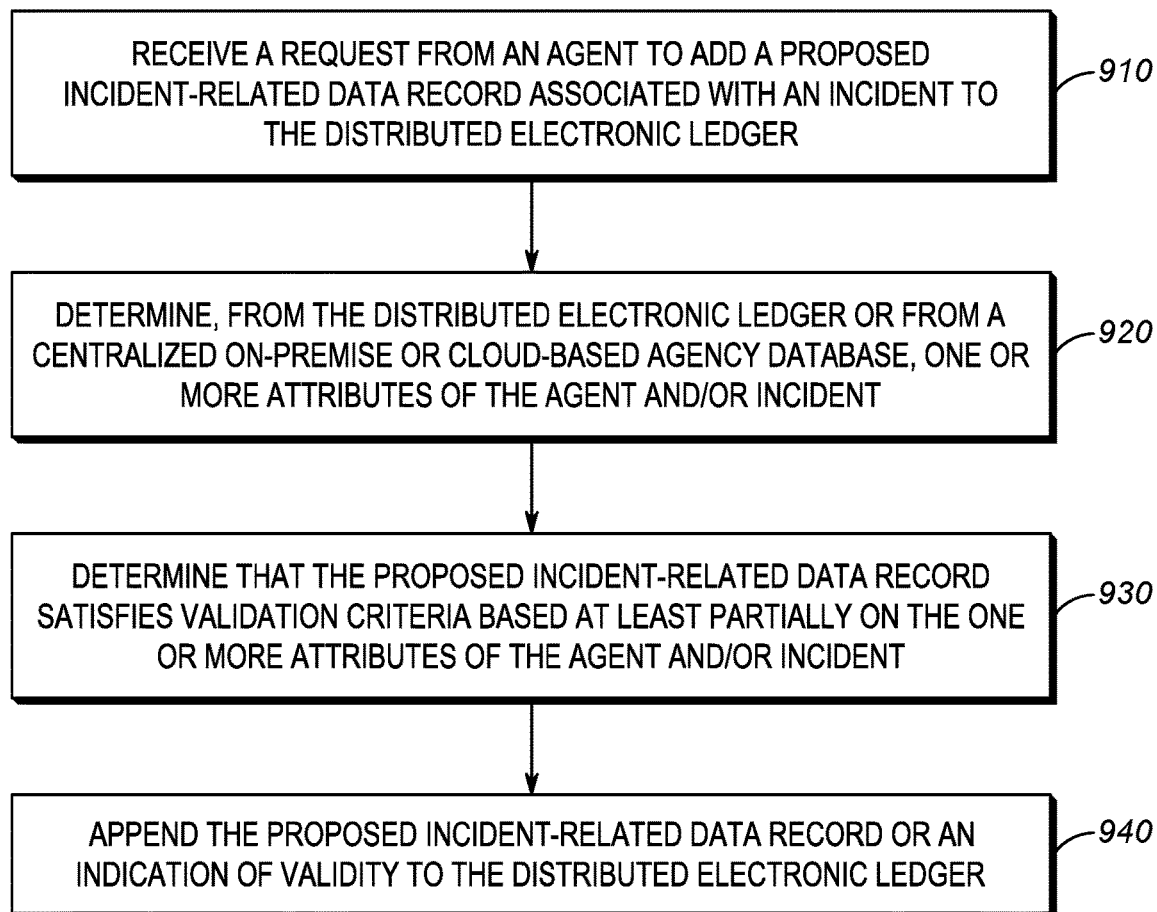
FIG. 9 is a process flow diagram illustrating a method for validating a proposed incident-related data record on the distributed electronic ledger, in accordance with some embodiments.

FIG. 9 illustrates a flow chart diagram of a method 900 that may be performed by a computer apparatus (e.g., a validator node) within the distributed ledger system. While a particular order of processing steps, message receptions, and/or message transmissions is indicated in FIG. 9 as an example, timing and ordering of such steps, receptions, and transmissions may vary where appropriate without negating the purpose and advantages of the examples set forth in detail throughout the remainder of this disclosure.

The process begins at block 910, where the computer apparatus receives a request from an agent to add a proposed incident-related data record associated with an incident to the distributed electronic ledger. As described above, the distributed electronic ledger may be a blockchain, but in other embodiments, may be some other type of distributed electronic ledger. The distributed electronic ledger may have a structure same or similar to any one or more of those set forth above. For example, the distributed electronic ledger may be a permissioned blockchain, in that only authorized computing devices and/or users may be allowed to validate data records (or perform other functions) within the blockchain. In some embodiments, the permissioned blockchain may be an intra-agency blockchain in which only members or a subset of members of the agency are permissioned or authorized to add new data records to the blockchain, while in other embodiments, the permissioned blockchain may be an incident specific blockchain in which only agency members assigned to an incident associated with the blockchain (e.g., by an admin or dispatcher or other member of the agency) are permissioned to add new data records to the blockchain. Other possibilities exist as well.

In some embodiments, the proposed incident-related data record may relate to a public safety incident such as a traffic accident, crime scene, public disturbance, fire, natural disaster, and the like. In other embodiments, the proposed incident-related data record may relate to a utility incident such as a downed power line, broken water main, gas leak, and the like. When a proposed incident-related data record regarding a new incident is created, an incident identifier ("ID") may be assigned to the incident that uniquely identifies the incident. The incident ID may, for instance, be an alphanumeric value, fixed length hash, or the like. In some embodiments, the agent may submit a proposed incident-related data record that defines one or more attributes of a particular incident (e.g., incident type, status, location, assignment of resources, dispatch of resources, roles for the incident, etc.). For instance, if the proposed incident-related data record assigns a characteristic to an incident (e.g., the incident is a chemical spill that requires a responder to be a chemical expert), the proposed incident-related data record may reference the incident using an incident ID as found in the proposed incident-related data record.

Although method 900 is described with respect to receiving, validating, and appending proposed incident-related data records, the steps of method 900 may also be employed with respect to other types of data records, such as attribute data records that may or may not relate to a particular incident. In this regard, the agent may submit a proposed attribute data record that defines attributes of an agent (e.g., agent's role, location, etc.) or resource (e.g., resource's status, skill set, equipment description or ID, etc.) within the agency.

In some embodiments, the agent may further submit proposed incident-related data records to assign resources to a particular incident. Said resources may be agents such as responders to an incident (e.g., police officers) or various types of equipment needed to resolve an incident (e.g., police vehicles, dash cameras, body cameras, etc.). In some embodiments, each resource may be assigned a unique resource ID that may be referenced by the distributed ledger system. For instance, an agent may submit an incident-related data record that assigns a particular police officer and vehicle to an incident. In such embodiments, both the officer and the vehicle will have individual unique resource ID's, both of which may be included in the proposed incident-related data record that assigns the officer and/or vehicle to the incident.

If, on the other hand, the proposed incident-related data record is a request by an agent to submit a large data file as incident evidence (e.g., a video file, audio file, image, and the like), the system may store the data file separately from the distributed ledger at a centralized on-premises or cloud-based agency database system. In such embodiments, the incident-related data record may, instead of the data file, contain a digital fingerprint (e.g., a hash of the data file) and a pointer to a location within the database system in which the data file may be found. At any point thereafter, a user or agent may compare the hash of the file as it currently exists in the database system with the original hash as recorded in the incident-related data record to determine whether the file exists in its original form or has been modified. Storing the original hash within the resilient and immutable digital ledger allows the system to readily establish the authenticity of the file that is stored on the database server and referenced in the incident-related data record.

As noted above, the proposed incident-related data record may further comprise metadata regarding physical incident evidence. Such metadata may include a description of the physical evidence, the time at which the evidence was collected, the identities of the collectors and/or subsequent custodians of the evidence (e.g., a chain of custody), the current location of the evidence, and the like.

The process continues to block 920, where the computer apparatus determines, from the distributed electronic ledger or from the centralized on premise or cloud-based agency database, one or more attributes of the agent relative to the incident and/or one or more attributes of the incident. In some embodiments, the apparatus conducts a series of validation checks based on the proposed incident-related data record to ensure that the agent and/or the incident have the appropriate attributes to add a new incident-related data record to the ledger. For instance, if the proposed incident-related data record is a proposed incident-related data record that opens a new incident and/or assigns an incident type, and if only dispatchers or CAD operators (e.g., 'administrators' within a public safety agency) within the agency are permitted to perform these functions, the apparatus may search previously written data records within the distributed ledger (or, in other embodiments, the centralized on premise or cloud-based agency database) for a data record which designates the agent as an "administrator" or "admin" (or "dispatcher" or "CAD operator"). In some embodiments, each agent is assigned a unique agent ID. In such embodiments, the apparatus may search previous data records that designate the submitting agent's agent ID as an "admin."

In some embodiments, the proposed incident-related data record may be an assignment of certain attributes to an incident, such as an assigning of an incident type, incident requirement(s), incident location(s), and the like. In such embodiments, the apparatus may perform validation checks to ensure that the agent submitting the proposed incident-related data record has the role of "admin" or is otherwise sufficiently associated with the incident (in the manners already set forth above) to add the proposed incident-related data record. In some embodiments, the "admin" role is defined in the genesis block of the distributed ledger. The apparatus may further verify that the assigned incident type is a valid type by searching for a previously written data records within the distributed ledger that defines a list of valid incident types. In some embodiments, the apparatus may further verify that the incident's location is within the jurisdiction of the agent and/or agency. To this end, the apparatus may search for a previously written incident-related data record within the distributed ledger that defines the jurisdiction of the agent and/or agency (e.g., location or map data).

The process continues to block 930, where the computer apparatus determines whether the proposed incident-related data record satisfies validation criteria based at least partially on the one or more attributes of the agent and/or incident. As described above, the determination of whether proposed incident-related data records satisfy validation criteria may depend on attributes of the agent, the agent's agency, attributes of the incident, attributes of the blockchain to which the new data record is being added, contents of the proposed data record, and/or the existence of previous incident-related data records within the distributed ledger which corroborate the validity of the proposed incident-related data record. For instance, if the incident type as found in a proposed incident-related data record matches at least one valid incident type found in a previously written incident-related data record in the distributed ledger, at least the "incident type" portion of the proposed incident-related data record might be considered to have satisfied the validation criteria. Furthermore, if the submitting agent is found to have the role of "admin" as defined in a previous data record (e.g., within the genesis block), the agent attribute requirements of the incident validation criteria might be considered to have been satisfied.

The apparatus may further perform talkgroup-based validation checks on proposed incident-related data records. If an agent submits a proposed incident-related data record related to a particular incident (e.g., a status update or scene evidence), the apparatus may verify that the agent has been assigned to the talkgroup that has been assigned to the incident. For example, a "fire talkgroup" may be assigned to an arson incident. If a responder (e.g., an investigator) submits a proposed incident-related data record that contains arson evidence obtained at the scene, the responder may be required to first be assigned to the fire talkgroup. Furthermore, the apparatus may verify that the talkgroup to be assigned to the incident is relevant to the type of incident. For example, the apparatus may allow the "fire talkgroup" to be assigned to the arson incident, but may not allow the "traffic accident talkgroup" to be assigned to the arson incident. In some embodiments, a talkgroup may be created with respect to a particular incident. For instance, a special incident-specific talkgroup may be created with respect to a confidential or restricted-access incident. In such embodiments, only agents assigned to the incident-specific talkgroup may be authorized to submit proposed incident-related data records regarding the specific incident.

Once the apparatus has evaluated the proposed incident-related data record using all of the validation criteria relevant to the proposed incident-related data record, the apparatus may move onto the next step in the process.

In some embodiments, determining that the proposed incident-related data record satisfies validation criteria may be based on a consensus algorithm. In such embodiments, the computer apparatus may submit a first validation vote. Generally, the first validation vote indicates whether the apparatus has found that the proposed incident-related data record has satisfied or failed to satisfy the validation criteria. In some embodiments, the apparatus may require that all aspects of the validation criteria are satisfied by the proposed incident-related data record. If the apparatus finds that the validation criteria have been satisfied, the apparatus may submit a "yes" vote to the other nodes of the distributed ledger. Conversely, if the apparatus finds that the validation criteria have not been satisfied, the apparatus may submit a "no" vote to the other nodes. The vote, whether "yes" or "no," may be propagated to the other nodes over the distributed ledger network.

In some embodiments, the apparatus may subsequently receive validation votes (e.g., one or more second validation votes) from the other nodes. Over time, each of the nodes of the distributed ledger will have received a sum of all of the votes from each node. The apparatus may then, based on the sum of the votes, determine via a consensus algorithm whether the proposed incident-related data record is valid. In some embodiments, the consensus algorithm requires that a threshold number (or ratio) of "yes" votes have been received before the proposed incident-related data record is considered to be valid. The disposition of the proposed incident-related data record may depend on the implementation of the distributed ledger according to different embodiments of the invention. For example, in some embodiments, only validated incident-related data records may be allowed to be written to the distributed ledger. In such embodiments, if the proposed incident-related data record has been validated via the consensus algorithm, the proposed incident-related data record may be appended to the distributed electronic ledger. On the other hand, if the proposed incident-related data record is found by the consensus algorithm to be invalid, the proposed incident-related data record may be excluded from the distributed electronic ledger.

In other embodiments, the validation checks may be performed on the proposed incident-related data record by executing chaincode (e.g., Hyperledger Fabric) or smart contract logic (e.g., on an Ethereum network) that may be separate from the consensus algorithm logic. In other words, the chaincode or smart contract logic may contain the validation checks to be used to evaluate proposed data records rather than the consensus algorithm. In such embodiments, the chaincode or smart contract logic may be used to determine the validity of the proposed incident-related data record while the additionally executed consensus algorithm may optionally be used to verify that the chaincode or smart contract logic was correctly executed by the validator nodes, that the nodes have found the proposed data record to be valid, and/or that a majority of the validator nodes agree on a result. Additionally or alternatively, and in some embodiments, the nodes may use the consensus algorithm to determine an order in which one or more proposed data records may be added to the distributed ledger or a timing at which the distributed ledger copies will be updated in relation to other proposed data records submitted to the distributed ledger.

In an exemplary embodiment, which may be implemented using Hyperledger Fabric, an agent may submit a proposed data record to a first set of nodes that host the distributed ledger, each of which may comprise a smart contract or chaincode that contain one or more validation checks. Each of the first set of nodes may execute the smart contract or chaincode and produce an endorsement (e.g., a vote as to whether the smart contract or chaincode has been correctly executed and/or whether the first set of nodes have found the proposed data record to be valid). Once the agent detects a threshold number of endorsements from the first set of nodes, the agent may submit the proposed data record to a second set of nodes (e.g., a set of orderer nodes, which may be the same or different from the first set of nodes). The orderer nodes may, based on a set of proposed data records received from one or more agents, submit votes to one another regarding the order (and/or timing for adding) of the submitted proposed data records. Once the votes have been propagated amongst the orderer nodes (e.g., a consensus has been reached), the orderer nodes may decide on the order (and/or timing) of proposed data records. The order of proposed data records may then be propagated to the first set of nodes, where each of the first set of nodes may verify that a threshold number of votes to validate the proposed data record have been reached and that the proposed data record is still valid (e.g., the distributed ledger system has not received other ledger updates that would invalidate the proposed data record). Each of the first set of nodes may then update its copy of the distributed ledger based on the order (and/or timing) of proposed data records as determined by the orderer nodes.

In some embodiments, proposed incident-related data records may be written to the distributed electronic ledger and/or a second distributed electronic ledger regardless of whether the proposed incident-related data record is valid, thereby preserving a durable record of all proposals submitted by agents within the agency. In such embodiments, the apparatus may append a subsequent incident-related data record (e.g., an indication of validity) to the distributed ledger and/or the second distributed electronic ledger that references the proposed incident-related data record submitted by the agent. If the nodes determine that the proposed incident-related data record is invalid (e.g., via a consensus algorithm and/or smart contract or chaincode logic), the subsequent incident-related data record may refer to the proposed incident-related data record as invalid. Conversely, if the nodes determine the proposed incident-related data record is valid, the subsequent incident-related data record may refer to the proposed incident-related data record as valid. In embodiments in which a second related distributed ledger is used, same or different processes for validating the incident-related data records may be used (e.g., via chaincode, smart contract, or consensus) between the first and second distributed ledgers and same or different consensus algorithms may be used between the first and second distributed ledgers.

In yet other embodiments, proposed incident-related data records may be written to a first distributed electronic ledger regardless of whether the proposed incident-related data record is valid. In such embodiments, the apparatus may append only validated proposed incident-related data records to a second distributed electronic ledger while omitting the proposed incident-related data records found to be invalid.

The process concludes at block 940, where the computer apparatus appends the proposed incident-related data record to the distributed electronic ledger. In some embodiments, the proposed incident-related data record is written to the distributed electronic ledger in response to the nodes determining that the proposed incident-related data record is valid (e.g., via a consensus algorithm and/or smart contract or chaincode logic). Accordingly, the distributed ledger may, in such embodiments, comprise only validated incident-related data records. That said, in other embodiments, the proposed incident-related data record may be written to the distributed ledger regardless of its validity as determined by the nodes. In such embodiments, the nodes may write an indication of validity (e.g., subsequent incident-related data record) to the distributed ledger that refers back to the proposed incident-related data record, where the subsequent incident-related data record indicates whether the proposed incident-related data record is valid or invalid. In yet other embodiments, the proposed incident-related data records may be written to a first distributed ledger regardless of their validity. In such embodiments, the nodes may write the proposed incident-related data record to a second distributed ledger upon finding that the proposed incident-related data record is valid. Conversely, if the proposed incident-related data record is found by the nodes to be invalid, the proposed incident-related data record may be excluded from the second distributed ledger.

The apparatus may continue to allow proposed incident-related data records to be submitted to the distributed ledger for as long as the incident is ongoing. That said, upon the disposition of an incident, an incident-related data record may be written to the distributed ledger that indicates that the incident has been completed (i.e., closed). In response to said incident-related data record, the apparatus may prevent subsequent incident-related data records which reference the completed incident from being written to the distributed ledger (i.e., the existence of the incident completion incident-related data record will cause validation checks for subsequent proposed incident-related data records that reference the incident to fail).

4. Conclusion

In accordance with embodiments of the disclosure, system and methods described herein can be advantageously employed in public safety or utility environments to manage incident-related data records and/or other types of data records and control workflow. By utilizing a distributed electronic ledger, public safety and/or utility agencies may be able to avoid the potential pitfalls of using centralized databases, which may present a single point of attack or failure, while establishing a verified, authentic chain of incident evidence. Furthermore, by using agent and/or incident data and/or metadata to perform validation checks on proposed incident-related data records, embodiments of the present disclosure provide an efficient way to manage agents and resources. For instance, by ensuring that an agent's attributes are compatible with the incident's attributes (e.g., the agent has not already been assigned to another incident, that the agent has the skills, qualifications, and/or job title necessary to handle the incident), embodiments of the disclosure helps to improve the efficiency of agency workflows by preventing misallocation or duplicative allocation of agents and other resources to the incidents that such resources have been tasked to resolve. Furthermore, the system may perform validation checks using tamper-resistant data records that are already validated and immutably stored on the distributed ledger (e.g., data records that have already been validated). As a result, future data records may be validated to a greater level of confidence in comparison to conventional methods.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A computer apparatus acting as a computing node for validating and appending incident-related data records on a decentralized incident-specific distributed electronic ledger distributed across a plurality of computing nodes including the computer apparatus, the apparatus comprising:
   a communication interface;
   one or more processors;
   a storage device; and
   a memory having executable code stored therein, wherein the executable code, when executed by the one or more processors, causes the one or more processors to:
      receive, via the communication interface, a request from a particular agent computing device associated with a particular agent of an agency to add a proposed incident-related data record block associated with an incident to which the agency is tasked with responding to the incident-specific distributed electronic ledger associated with the incident and stored at the storage device, where existing record blocks within the incident-specific distributed electronic ledger may not be modified by the computing nodes and new or modified incident information may only be added through the addition of a new record block in the incident-specific distributed electronic ledger, existing record blocks in the incident-specific distributed electronic ledger identifying one or more agents associated with the agency, including the particular agent, and assigned to the incident, and identifying one or more of an incident type of the incident, an incident location of the incident, an incident status of the incident, incident roles of the one or more agents assigned to the incident, locations of the one or more agents assigned to the incident, agency equipment assigned for responding to the incident, and media files or links thereto of collected evidence relating to the incident;
      determine, by the one or more processors and from the existing record blocks of the incident-specific distributed electronic ledger, one or more agent attributes of the particular agent relative to the incident selected from one or more of an incident status of the particular agent, a skill set of the particular agent, a location of the particular agent relative to the incident location, and an incident role of the particular agent at the incident;
      determine, by the one or more processors, that the proposed incident-related data record block satisfies validation criteria for adding the proposed incident related data record block to the incident-specific distributed electronic ledger based at least partially on the determined one or more agent attributes of the particular agent relative to the incident; and
      responsive to determining that the proposed incident-related data record block satisfies the validation criteria, one of (i) appending, by the one or more processors, the proposed incident-related data record block to the incident-specific distributed electronic ledger to create a revised incident-specific distributed electronic ledger and storing the revised incident-specific distributed electronic ledger in the storage device and (ii) appending, by the one or more processors, an indication of validity to the incident-specific distributed electronic ledger referencing the proposed incident-related data record block already appended to a second incident-specific pre-validation distributed electronic ledger associated with the incident to create a revised incident-specific distributed electronic ledger and storing the revised incident-specific distributed electronic ledger in the storage device.

2. The computer apparatus according to claim 1, wherein the executable code, when executed by the one or more processors, causes the one or more processors to:
   based at least partially on determining that the proposed incident-related data record satisfies the validation criteria, submit a first validation vote to the remaining plurality of other computing nodes.

3. The computer apparatus according to claim 2, wherein the executable code, when executed by the one or more processors, causes the one or more processors to:
   receive one or more second validation votes submitted by the remaining plurality of other computing nodes; and
   based at least partially on the first validation vote and the one or more second validation votes, determine, via a consensus algorithm executed by the one or more processors in collaboration with the plurality of computing nodes, that the proposed incident-related data record block satisfies the validation criteria.

4. The computer apparatus according to claim 1, wherein the proposed incident-related data record block is appended to the incident-specific distributed electronic ledger regardless of whether the proposed incident-related data record block satisfies the validation criteria.

5. The computer apparatus according to claim 4, wherein the executable code, when executed by the one or more processors, causes the one or more processors to, responsive to determining that the proposed incident-related data record block satisfies the validation criteria, append the indication of validity of the proposed incident-related data record block to the incident-specific distributed electronic ledger.

6. The computer apparatus according to claim 1, wherein the executable code, when executed by the one or more processors, causes the one or more processors to:
determine that the incident has been completed; and
in response to determining that the incident has been completed, close the incident-specific distributed electronic ledger and prevent addition of any further data record blocks relative to the incident to the incident-specific distributed electronic ledger.

7. The computer apparatus according to claim 1, wherein the executable code, when executed by the one or more processors, causes the one or more processors to determine, from the distributed electronic ledger, one or more attributes of the incident selected from one or more of a type of the incident, requirements for responding to the incident, and resources assigned to the incident, wherein determining that the proposed incident-related data record satisfies the validation criteria is further based at least partially on the one or more attributes of the incident.

8. The computer apparatus according to claim 1, wherein the executable code, when executed by the one or more processors, causes the one or more processors to:
receive a request from a dispatch computing device of an agency dispatcher to add a proposed attribute data record block to the incident-specific distributed electronic ledger, the proposed attribute data record block provisioning an attribute of the particular agent relative to the incident;
validate the proposed attribute data record block using agency-specific database of agency employee information; and
append the proposed attribute data record block to the incident-specific distributed electronic ledger;
wherein determining that the proposed incident-related data record block satisfies the validation criteria is based at least partially on the proposed attribute data record appended to the incident-specific distributed electronic ledger.

9. The computer apparatus according to claim 1, wherein the incident-specific distributed electronic ledger is a blockchain and each record block after a first genesis block includes a hash value relative to one or more previous record blocks.

10. The computer apparatus according to claim 1, wherein the distributed electronic ledger is a permissioned blockchain modifiable only by agent devices of agents assigned to the incident as identified in the incident-specific distributed electronic ledger, but is viewable by anyone.

11. The computer apparatus according to claim 1, wherein:
receiving the request from the particular agent computing device to add the proposed incident-related data record block comprises receiving the request from a computing device associated with a police officer associated with a police agency to add the proposed incident-related data record block associated with the incident, wherein the incident is a public safety incident, wherein the proposed incident-related data record block comprises electronic evidence retrieved at the public safety incident or metadata of physical evidence retrieved at the public safety incident;
determining, from the distributed electronic ledger, one or more agent attributes of the particular agent relative to the incident comprises determining, from the incident-specific distributed electronic ledger, one or more attributes of the police officer, wherein the one or more attributes of the police officer comprises a status of the police officer, a skill set of the police officer, a location of the police officer relative to the incident, or an assigned role of the police officer at the incident; and
determining that the proposed incident-related data record block satisfies validation criteria based at least partially on the determined one or more agent attributes comprises determining that the police officer is currently assigned to the public safety incident, that the location of the police officer is within a threshold distance from the location of the public safety incident, that the role of the police officer is appropriate for the public safety incident, or that the police officer is not currently assigned to another incident.

12. The computer apparatus according to claim 1, wherein the one or more agent attributes of the particular agent retrieved from existing record blocks of the incident-specific distributed electronic ledger and used to determine that the proposed incident-related data record block satisfies validation criteria for adding the proposed incident related data record block to the incident specific distributed electronic ledger is an assignment of the particular agent to a particular talkgroup for group communications associated with the incident.

13. The computer apparatus according to claim 1, wherein the incident-specific distributed electronic ledger includes an incident-related data record block that assigns a unique incident identifier to the incident-specific distributed electronic ledger uniquely identifying the incident.

14. The computer apparatus according to claim 1, wherein a first record block associated with the particular agent includes a first agent attribute of "in route" appended while in response to the agent traveling in route to the incident, and upon arrival, a second record block associated with the particular agent includes an updated second agent attribute of "on scene" appended ion response to the particular agent's arrival at the incident scene.

15. The computer apparatus according to claim 14, wherein the executable code, when executed by the one or more processors, causes the one or more processors to:
receive an evidentiary record block from the particular agent computing device associated with the particular agent including evidentiary information from the incident for addition to the incident-specific distributed electronic ledger;
validate, by the one or more processors, that the evidentiary sensor information was generated by sensors assigned to the particular agent, and that a location of the particular agent was within a threshold distance of a location of the incident at a time the evidentiary sensor information was generated; and
append the validated evidentiary record block to the incident-specific distributed electronic ledger.

16. The computer apparatus according to claim 14, wherein the evidentiary information from the incident is a video of the incident scene taken by a recording device associated with the particular agent, and wherein the executable code, when executed by the one or more processors, causes the one or more processors to:
store the video at a cloud-based or on-premises agency video database communicably coupled to the apparatus; and
refrain from storing the video in the incident-specific distributed electronic ledger, but instead, store a hash of the video and a pointer to the location of the video at the video database in the validated evidentiary record block in the incident-specific distributed electronic ledger.

17. The computer apparatus according to claim 1, the incident-specific distributed electronic ledger identifying an incident type of the incident, an incident location of the incident, an incident status of the incident, incident roles of the one or more agents assigned to the incident, and media files or links thereto of collected evidence relating to the incident.

18. The computer apparatus according to claim 1, wherein the executable code, when executed by the one or more processors, causes the one or more processors to:
   determine, by the one or more processors and from the existing record blocks of the incident-specific distributed electronic ledger, one or more agent attributes of the particular agent relative to the incident including at least the incident status of the particular agent.

19. The computer apparatus according to claim 1, wherein the executable code, when executed by the one or more processors, causes the one or more processors to:
   determine, by the one or more processors and from the existing record blocks of the incident-specific distributed electronic ledger, one or more agent attributes of the particular agent relative to the incident including at least the skill set of the particular agent; and
   determine, by the one or more processors, that the proposed incident-related data record block satisfies validation criteria for adding the proposed incident related data record block to the incident-specific distributed electronic ledger based at least partially on the determined skill set of the particular agent.

20. The computer apparatus according to claim 1, wherein the executable code, when executed by the one or more processors, causes the one or more processors to:
   determine, by the one or more processors and from the existing record blocks of the incident-specific distributed electronic ledger, one or more agent attributes of the particular agent relative to the incident including at least the location of the particular agent relative to the incident location; and
   determine, by the one or more processors, that the proposed incident-related data record block satisfies validation criteria for adding the proposed incident related data record block to the incident-specific distributed electronic ledger based at least partially on the determined location of the particular agent relative to the incident location.

21. The computer apparatus according to claim 1, wherein the executable code, when executed by the one or more processors, causes the one or more processors to:
   determine, by the one or more processors and from the existing record blocks of the incident-specific distributed electronic ledger, one or more agent attributes of the particular agent relative to the incident including at least an incident role of the particular agent at the incident; and
   determine, by the one or more processors, that the proposed incident-related data record block satisfies validation criteria for adding the proposed incident related data record block to the incident-specific distributed electronic ledger based at least partially on the determined incident role of the particular agent at the incident.

22. A computer program product for validating and appending incident-related data records on a distributed electronic ledger, the computer program product comprising at least one non-transitory computer readable medium having computer-readable program code portions embodied therein, the computer-readable program code portions comprising:
   an executable portion for receiving, via a computer apparatus acting as a computing node for validating and appending incident-related data records on a decentralized incident-specific distributed electronic ledger distributed across a plurality of computing nodes including the computer apparatus, where existing record blocks within the incident-specific distributed electronic ledger may not be modified by the nodes and new or modified incident information may only be added through the addition of a new record block in the incident-specific distributed electronic ledger, a request from particular agent computing device associated with particularly agent of an agency to add a proposed incident-related data record block associated with an incident to which the agency is tasked with responding to the incident-specific distributed electronic ledger associated with the incident and stored at a storage device at the computer apparatus;
   an executable portion for determining, via the computer apparatus and from the existing record blocks of the incident-specific distributed electronic ledger, one or more agent attributes of the particular agent relative to the incident or of the incident selected from one or more of an incident status of the particular agent, a skill set of the particular agent, a location of the particular agent relative to the incident location, and an incident role of the particular agent at the incident;
   an executable portion for determining, via the computer apparatus, that the proposed incident-related data record block satisfies validation criteria for adding the proposed incident related data record block to the incident-specific distributed electronic ledger based at least partially on the determined one or more agent attributes of the particular agent relative to the incident; and
   an executable portion for, responsive to determining that the proposed incident-related data record block satisfies the validation criteria, one of (i) appending, via the computer apparatus, the proposed incident-related data record block to the incident-specific distributed electronic ledger to create a revised incident-specific distributed electronic ledger and storing the revised incident-specific distributed electronic ledger in the storage device and (ii) appending, via the computer apparatus, an indication of validity to the incident-specific distributed electronic ledger referencing the proposed incident-related data record block already appended to a second incident-specific pre-validation distributed electronic ledger associated with the incident to create a revised incident-specific distributed electronic ledger and storing the revised incident-specific distributed electronic ledger in the storage device.

23. A computer-implemented method for validating and appending incident-related data records blocks on an incident-specific distributed electronic ledger, the method comprising:
   receiving, via a computer apparatus acting as a computing node for validating and appending incident-related data records on a decentralized incident-specific distributed electronic ledger distributed across a plurality of computing nodes including the computer apparatus, where existing record blocks within the incident-specific distributed electronic ledger may not be modified by the nodes and new or modified incident information may only be added through the addition of a new record block in the incident-specific distributed electronic ledger, a request from a particular agent computing device associated with a particular agent of an agency to add a proposed incident-related data record block associated with an incident to which the agency is tasked with responding to the incident-specific distributed electronic ledger associated with the incident and stored at a storage device at the computer apparatus;

determining, via the computer apparatus and from the existing record blocks of the incident-specific distributed electronic ledger, one or more agent attributes of the particular agent relative to the incident selected from one or more of an incident status of the particular agent, a skill set of the particular agent, a location of the particular agent relative to the incident location, and an incident role of the particular agent at the incident;

determining, via the computer apparatus, that the proposed incident-related data record block satisfies validation criteria for adding the proposed incident related data record block to the incident-specific distributed electronic ledger based at least partially on the determined one or more agent attributes of the particular agent relative to the incident; and responsive to determining that the proposed incident-related data record block satisfies the validation criteria, one of (i) appending, via the computer apparatus, the proposed incident-related data record block to the incident-specific distributed electronic ledger to create a revised incident-specific distributed electronic ledger and storing the revised incident-specific distributed electronic ledger in the storage device and (ii) appending, via the computer apparatus, an indication of validity to the incident-specific distributed electronic ledger referencing the proposed incident-related data record block already appended to a second incident-specific pre-validation distributed electronic ledger associated with the incident to create a revised incident-specific distributed electronic ledger and storing the revised incident-specific distributed electronic ledger in the storage device.

* * * * *